United States Patent [19]
Peters

[11] Patent Number: 5,769,269
[45] Date of Patent: Jun. 23, 1998

[54] VENDING SYSTEM

[76] Inventor: Steven A. Peters, 2320 NE. 193rd St., N. Miami Beach, Fla. 33180

[21] Appl. No.: 636,588

[22] Filed: Apr. 23, 1996

Related U.S. Application Data

[63] Continuation-in-part of Ser. No. 234,143, Apr. 28, 1994, abandoned.

[51] Int. Cl.$^6$ .................................................. G07F 11/00
[52] U.S. Cl. .................................................. 221/7; 360/92
[58] Field of Search .................................. 221/2, 3, 7, 9, 221/13, 131; 194/205, 906; 360/92

[56]  References Cited

U.S. PATENT DOCUMENTS 3,947,882   3/1976   Lightner .................................. 194/906
4,954,697   9/1990   Kokubun et al. .......................... 235/381

Primary Examiner—Kenneth Noland
Attorney, Agent, or Firm—Finnegan, Henderson, Farabow, Garrett & Dunner, L.L.P.

[57] ABSTRACT

A vending system includes a central service center connectable over phone lines to a plurality of multi-functional vending machines for audio/video and high speed data exchanges, as well as voice exchanges between customers and a service center operator. Each vending machine includes the capability of playing music video and other audio/video presentations in predetermined order or in preferential order in response to on-site and off-site customer selections and vending customer-selected products from inventor storage, such as debit cards, CDs, tape cassette tapes and players, batteries, etc. Each vending machine also includes a printer for printing and dispensing to customers receipts, tickets, facsimile documents, etc.

19 Claims, 19 Drawing Sheets

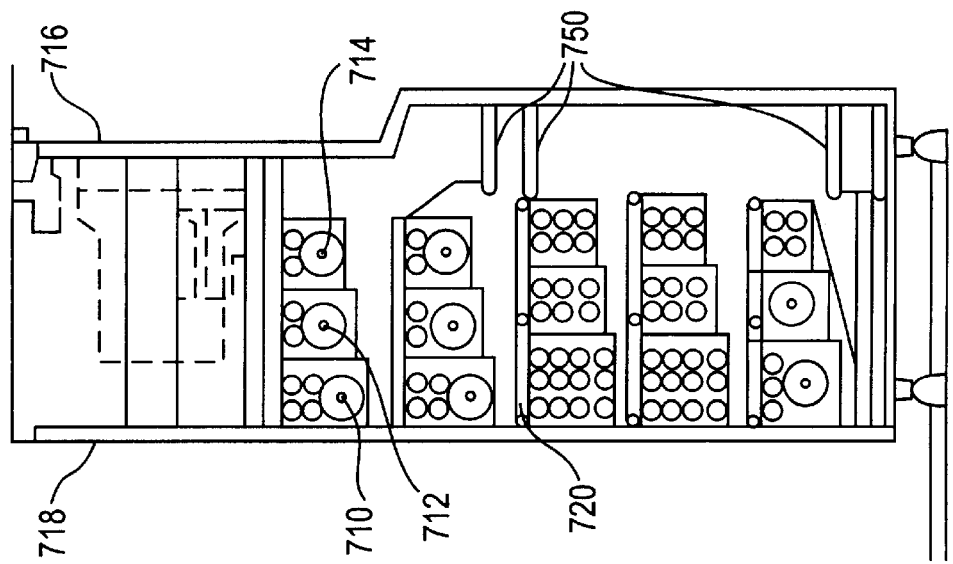
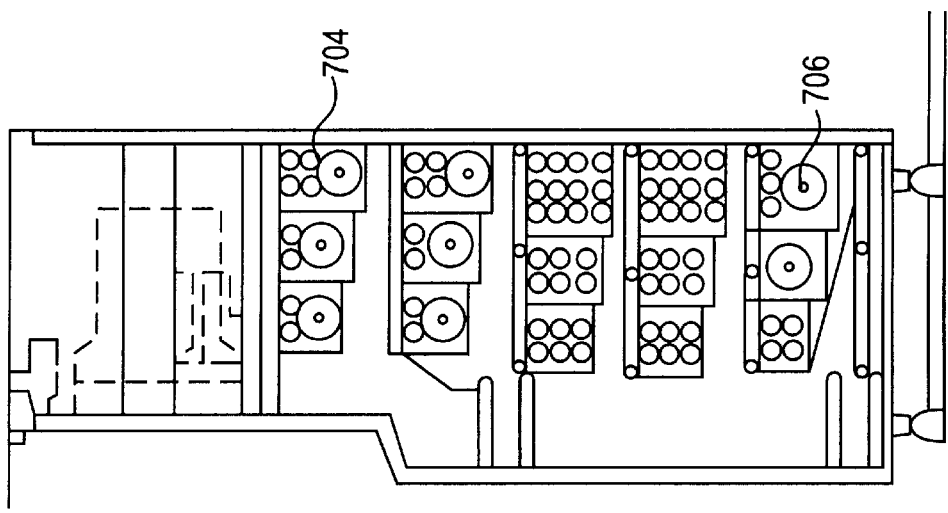

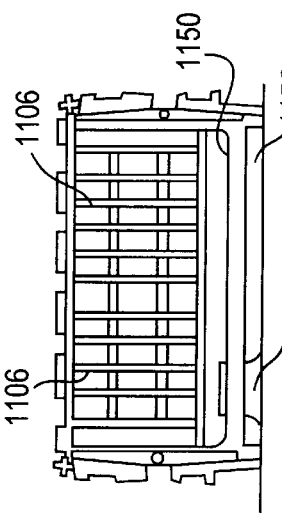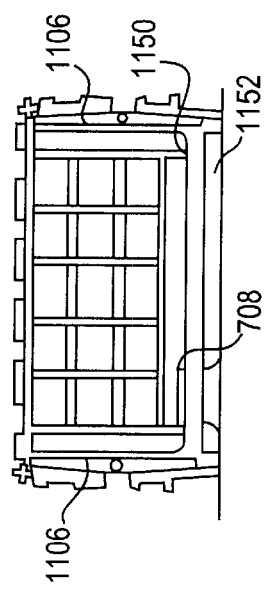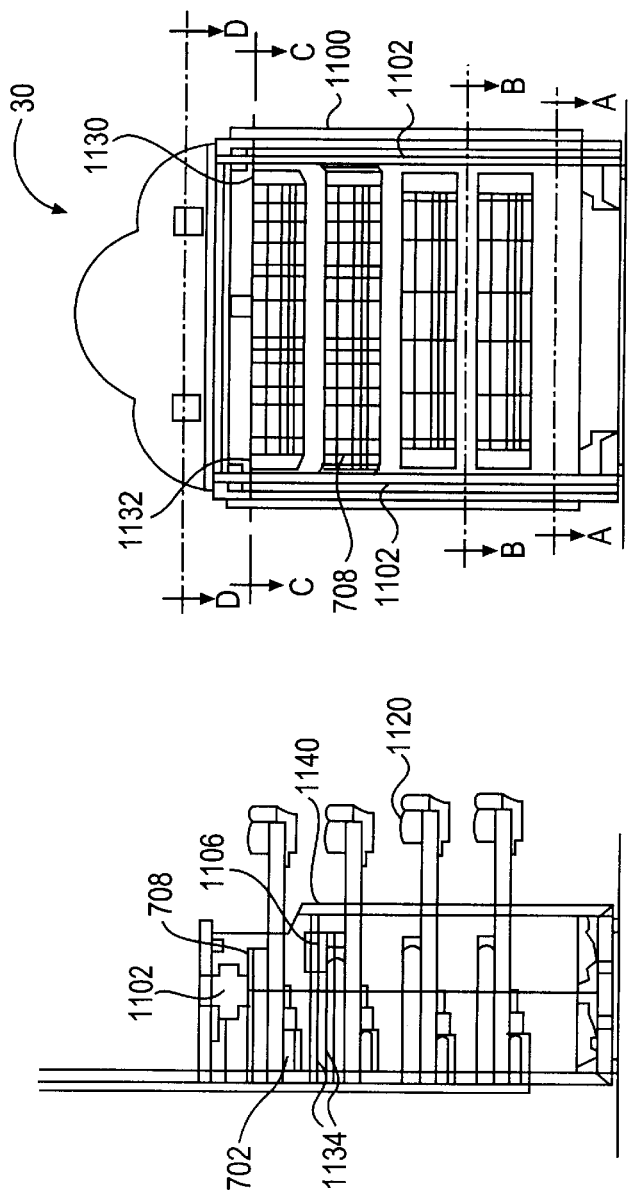

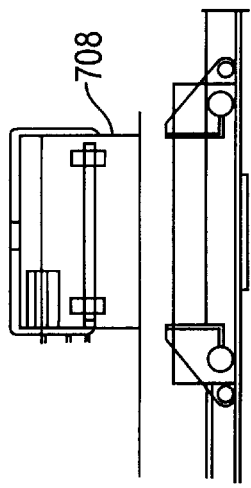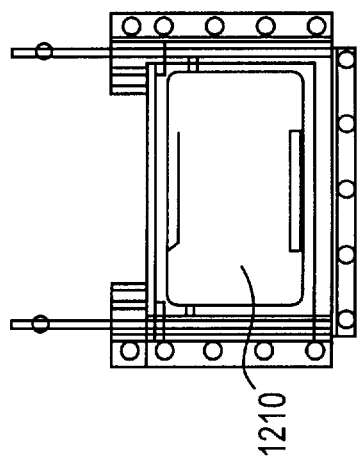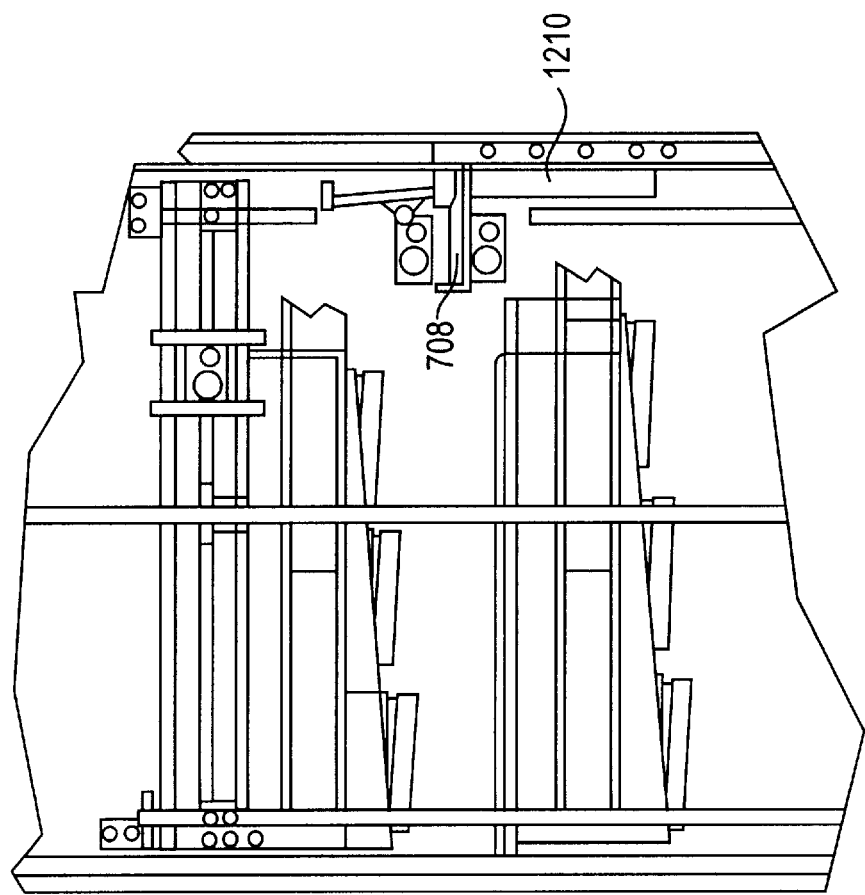

VENDING SYSTEM

REFERENCE TO RELATED APPLICATION

This application is a continuation-in-part application of application Ser. No. 08/234,143, filed Apr. 28, 1994 now abandoned.

FIELD OF THE INVENTION

The present invention relates to a computerized vending system for dispensing a variety of products, both on-site and at remote locations.

BACKGROUND OF THE INVENTION

With the increasing ease in which information can be communicated and stored in digital form, the entertainment industry is undergoing a revolution in how to distribute its products. Presently, the entertainment market provides customers with a variety of media, such as CD-ROM's, interactive TV, video networks, laser discs, on-line services, cassette tapes, and compact discs etc. However, the sales of most products, typically through music stores and computer stores, remains primarily unchanged. With the increased mobility of buyers, the convenience of purchasing products, such as music and music video presentations and recordings, as well as other products, at other outlet sites would be valuable to vendors and vendees, alike particularly since many such purchases are made on the spur of the moment. Usually the desire for cassette tapes and/or compact disc, for example, occurs in places where a music store cannot be found, at airports, hotels, convenience stores, lounges, etc.

To address this need, music product vending machines have been developed, however, to a large extent, those machines remain experimental and have not been found to be acceptable replacements for a music store. One problem with some vending machine designs is their limited selection. To overcome this limitation, vending systems have been developed to enable audio information to be remotely retrieved from a central location and recorded in a vending machine and dispensed as an audio tape.

For example Lightner, U.S. Pat. Nos. 3,718,906 and 3,947,882 disclose remote recording and vending systems. However, Lightner's systems merely record and then vend cassettes, and thus fail to provide the customers with a full array of other musical media, such as compact discs. In addition, Lightner fails to provide users with the ability to review music videos, commercial advertisements, and picture telephone transmission along with audio interactive contact with a remote host. Moreover, Lightner fails to disclose remote monitoring, and controlling capabilities, and security features desirable in modern vending machines.

Another shortcoming of current vending technology is the lack of a flexible communications architecture allowing the transfer of information that reflects the array of products sold by the vending machine, i.e. data such as audio, video and text as well as to provide voice communications between the vending machine and the remote monitoring site.

For example, Sedam, et al., U.S. Pat. No. 4,412,292, discloses a system which remotely monitors vending machines. This system is designed to receive, at a central location, information from vending machines for analyses and control purposes. However, Sedam, et al. only provide for the interchange of electronic signals pertaining to sensor states, i.e., monitoring cash functions and inventory levels. Sedam, et. al., however, fails to provide a two-way communication between the remote units and the central control station. Instead all communications are only from the remote to the central unit. Moreover, this patent fails to suggest how to apply the communications functions to assist customers or provide data for capture into products. Other features lacking in Sedam et al. include audio/video simultaneously on the same phone line, alarm, diagnostics, security, print capability and voice communications.

Another example is Walker, U.S. Pat. No. 4,845,636. Walker provides a remote transaction system useful in conducting business transactions by providing visual contact between a buyer and a seller. However, Walker does not provide such capabilities over conventional phone lines, but instead utilizes direct-cable links. Moreover, the cabling only allows for the transfer of video information. Also, Walker does not provide any diagnostic capabilities necessary for a full-fledged music vending machine, including security, inventory control, sales monitoring, or providing video or audio data for custom recording remotely at the vending machine.

Thus, there is need for a vending machine in which digital or analog-audio, and/or video information can be recorded and vended and in which monitoring, audio communications and video communications, security, diagnostics, playback, inventory, sales and accounting features, alarm, security and printing capabilities can be provided in a system including plural vending machines interconnected via telephone lines to a host/central location.

SUMMARY OF THE INVENTION

It is, therefore, a primary object of the invention to provide a music vending system, wherein, as a result of the software and hardware communications design, the system is capable of receiving digital video and/or audio data that can in turn be stored and used to record customer-designated music selections on recordable compact discs or cassette tapes as well as prerecorded and prepackaged musical selections.

It is another object of the invention to provide vending machine data exchange capability performed and monitored by computer. The computer also monitors mechanical control and product delivery functions of a vending machine. Control monitoring is accomplished locally at the vending machine sites and over a communications network to a host station. The vending machines also have self-diagnostics capabilities, debit and credit card transaction features and an automated product inventory control and accounting capabilities.

It is yet an additional object of the invention to provide a vending machine that displays music videos, audio-only samples, video advertising and live video/audio to customers and/or operators. The video information can also be randomly displayed by the vending machine or by remote, interconnected TV receivers can be played in pre-set sequences, or can be randomly accessed out of sequence by vending machine customers on and off-site for a pre-set fee.

It is a further object of the invention to provide a vending machine whose menu selection, pricing information, and "how to" instructions can be readily changed remotely by computer modem and accessed by the customer through a custom keypad interface. Moreover, these menu, pricing and "how to" functions are presented in a graphical user interface which also concurrently displays entertainment, such as music videos and/or advertisements, simultaneously for the customer.

It is another object of the invention to provide a vending machine system whereby the vending machine automatically senses when it is "out-of-stock", and automatically updates the menu selections for the user, based upon product availability.

It is yet an additional object of the invention to provide a remote transaction monitoring system wherein a customer service representative can service, monitor and assist customers by computer modem access from a remote monitoring site on a single phone with a single connection, which connection allows transfers of data regarding the multi-functional capabilities of the vending machine.

It is yet an additional object of this invention to provide vending machines which are capable of communicating with a central customer service location via telephone communications, including ISDN, T1 and standard analog protocol, such that the vending machines can send and receive high speed data transmissions,such as still image video, data, audio and facsimile transmissions.

It is an additional object of this invention to provide a vending machine for dispensing debit cards, as well as tickets for entertainment events available from a computerized ticket inventory; the vending machine having the further capability of affording user selection of ticket seat locations based on video portrayals of actual views of entertainment events from the available seat locations.

It is yet a further object of the invention to provide a vending system which uses analog or digital video technology to deliver still and real time video and permit file transfer and playback of analog or digital real-time and still image information.

It is a further object of this invention to provide a mechanical product delivery system that can securely and reliably deliver products to customers using a single platen delivery mechanism, which translates in x,y,z axes to retrieve and move selected products to a customer access point.

Briefly described, these and other objects of the invention are realized in its apparatus aspects by providing a vending machine comprising communications means for switching between communicated data for display and output as either video, audio text or facsimile communications, the latter of which are communicated to the user/operator as text produced by a printer. The system further includes a transducer means for converting received data to an appropriate medium for dispensing product, a camera means for providing customer profile or surveillance video input to the communications means and a storage means for storing video data, audio data and technical information. The vending machine further includes means for checking inventory levels, approving currency and credit transactions, and monitoring the mechanical status of the machine. The system also comprises a remote monitoring means for communicating with the vending machine, whereby remote monitoring can occur such that each vending machine's operational status and inventory level, that can be monitored, is updated and transmitted remotely by the communications means on a single telephone line with a single connection, which utilizes a telephone switching board allowing the transport and transfer between audio, video and data.

These and further objects, features and advantages of the present invention will become apparent upon consideration of the following detailed description of the preferred embodiment thereof taken in conjunction with the accompanying drawings and detailed description.

BRIEF DESCRIPTION OF THE DRAWINGS

FIGS. 7A–7C are front and side elevational views illustrating product inventory and retrieval features included in the vending machine 30 of FIG. 1B;

FIGS. 11A–11D show front, side and top views of a second product retrieval drive arrangement for the vending machine 30; and FIGS. 12A–12C are views illustrating the interaction between the platen and a product delivery chute included in vending machine 30.

DESCRIPTION OF THE PREFERRED EMBODIMENTS

Figure 1A:
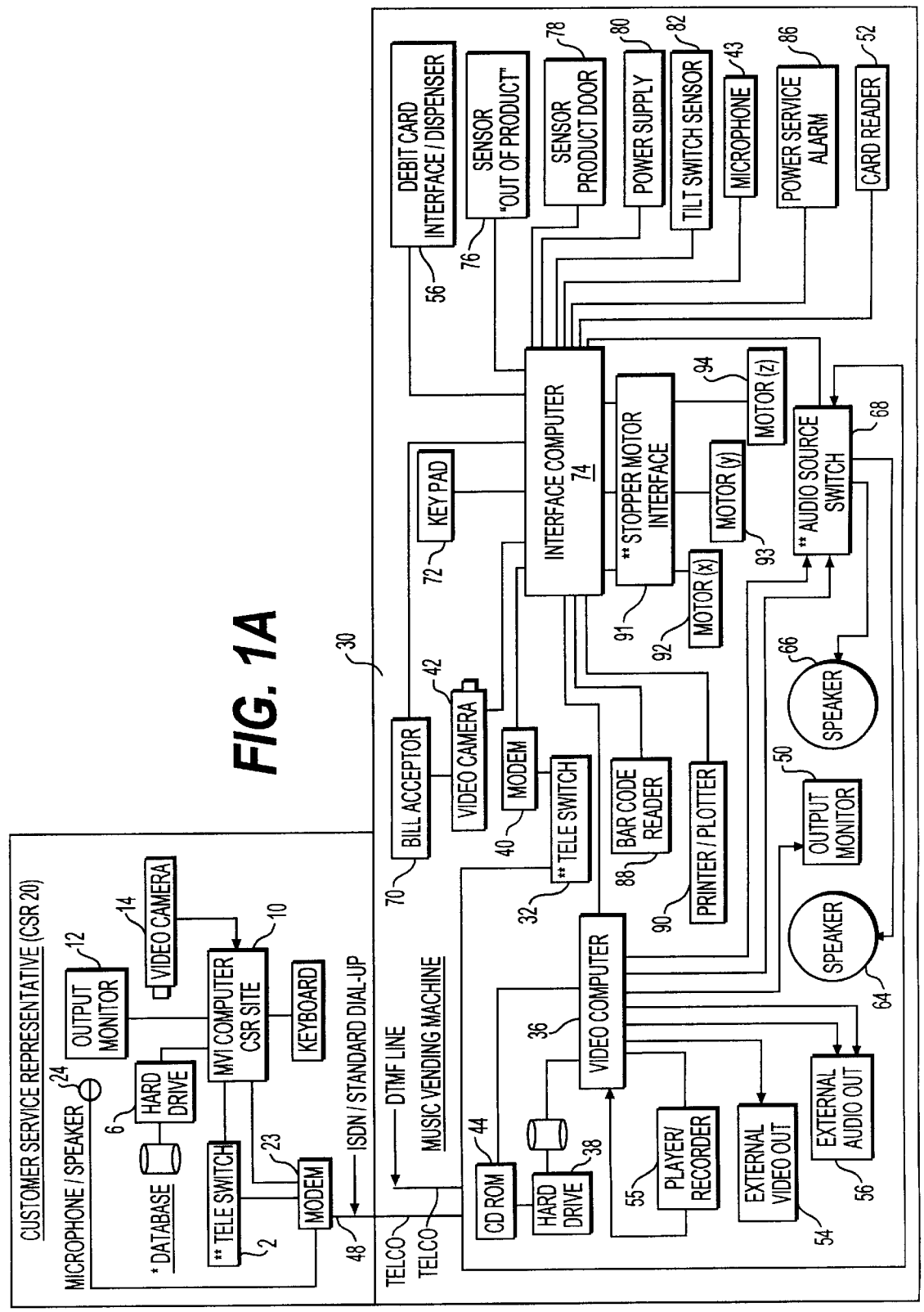
FIG. 1A is a block diagram of a preferred embodiment of a vending system in accordance with the present invention.

Referring specifically to FIG. 1 of the accompanying drawings, there is illustrated a system comprising a multiplicity of vending machines 30 (one illustrated in FIG. 1), which are connected to a central/host station (CSR) 20 via telephone communications line 48. The telephone communications line 48 may be adapted to support an integrated service digital network (ISDN) which provides a wide variety of services including video, audio, text, and facsimile, data (both switched and non-switched in both circuit and packet-modes). Data is provided across the ISDN channels at a rate of 64 kb/s on the B channel (accompanied by timing). The ISDN may be supported on a public telephone network. However, the communications link may be a private branch exchange (PBX) or appropriate private network such as a local or wide area network (LAN or WAN respectively). For each vending machine 30, connection to the telcoline 48 is made via teleswitch 32 and modem 40 tied through a serial communications line to an interface computer 74. The teleswitch 32 is designed to appropriately switch and signal the data-type being applied across the public (or private) telephone line 48. A detailed description of an appropriate teleswitch 32 for use in the present invention is provided below with reference to FIG. 5.

Each vending machine also includes a video computer 36, which consists of, for example, an Intel 80-486 based microprocessor having at least four megabytes of RAM (not shown), a removable floppy drive and at least an 500 megabyte IDE/SCSI hard drive 38. The video computer 36 is connected to a SVGA monitor 50 and to interface computer 74.

The arrangement of teleswitch 32 and modem 40 provides the capability of handling digital information that supports audio, text and video data transfer across the telephone lines 48. To support data communications, the vending machine 30 contains sufficient memory to buffer and store data in a transparent manner. The database memory organization for video computer 36 that enables a rapid read/write of data includes a semiconductor memory cache (not shown) of sufficient size so that the hard drive 38 and a CD-ROM Drive 44 can be accessed with minimal delay. A description of the databases used by the vending machine 30 and the customer service representative 20 (hereinafter "CSR") will be provided in further detail below.

The Databases

The vending machine 30 and CSR 20 share information across telco line 48. This information is organized into four databases, which are stored in all vending machines and at the CSR. This redundancy permits full data security in the event of a breakdown of any vending machines 30 or the CSR computer 10.

Specifically, each vending machine and CSR stores, in a first database, address and identity data which informs the system of each machine's and host's identity. In addition, each vending machine communicates an automatic identification number to the CSR 20. Finally, communications also include information regarding each machine's status, location, and sales.

This first database, known as the machine database, contains the following information: (i) machine identification code, (ii) machine location, (iii) vendor identification, (iv) product sales figures, (v) machine activation date, and (vi) machine deactivation date. Each of these fields is discussed below.

The machine identification code (i) is an identification number or code which automatically identifies the vending machine. When a vending machine 30 communicates with the host computer 10, the host computer 10 is able to address a remote password which corresponds to the vending machine ID and which enables communication from the CSR 20 to the corresponding vending machine 30. The machine location field (ii) is an encoded value (such as an alphanumeric descriptor) which defines the placement or locale of the machine. Location is a valuable piece of information for the system administrator, franchisee, service operator, supplier or security service/police. From the standpoint of security, the location field obviously is valuable if the vending site has been robbed, or if the site operator otherwise needs to contact police. From a repair standpoint, location is critical for notifying machine servicers of the machine's locale. Location is also important in order to differentiate machines that are placed in the same general area. Thus, if several vending machines 30 are located at the same airport, shopping mall, or area of the city, the location data is valuable to differentiate one site from the other.

The vendor field (iii) identifies to the CSR who owns and potentially services a vending machine. Vendor data is valuable from the standpoint of billing individual vendors for CSR services, notifying vendors of problems with their machines, and providing inventory control. The machine sales field (iv) provides a total sales value figure representing all cumulative sales for the identified vending machine 30 at the time that data is accessed. Finally, the activation date (v) and deactivation date fields (vi) respectively identify the date that each vending machine 30 was first put into service and the date that a vending machine was shut down. This information enables the system to automatically identify and create log entries when vending machine calls to the CSR 20 occur. In addition, these fields enable the CSR site operator to separate help requests (to be discussed below) from alarm entries provided from the various machine sensors (to be discussed below as well). The log entries also include information regarding audio/video clips at the time the call is taken.

The second database is a vendor database. The fields in the vendor database are valuable since they provide reports pertaining to the sales for each vendor in order that a system manager can review and track how each vendor is doing. The data for vendors includes accounting information, inventory control information and marketing information.

Specifically, the vendor database includes (i) a vendor identification number and (ii) region data for that vendor. The region data (ii) is particularly valuable from the standpoint of licensing, so as to avoid overlaps in the event that exclusive licenses are provided on a regional basis. The vendor database also includes (iii) the vendor's name, (iv) the vendor's address, (v) the vendor's city, (vi) the vendor's telephone number, (vii) the vendor's fax number and (viii) the total number of machines owned and/or operated by the vendor. A total sales accounting value (ix) is also included so that updated sales data are automatically logged by the system. The inventory is also tracked vis-a-vis sales data for each vendor so that best selling item data (x) are stored in the vendor database. Thus, each vendor can quickly ascertain what the hottest seller is so as to best predict inventory orders. Finally, the vendor longevity is tracked by a "vendor since" column (xi) and the vendor status is indicated in a vendor active or inactive field (xii).

The vendor database, when combined with the information in the machine database, can be used to create activity reports which integrate information from the various databases, sort that information by sort index given by the vendor, and provide reports desired by any vendor.

A third database, the sales database, contains detailed information on products. The data includes (i) an internal number, (ii) the artist's name, (iii) the product title, (iv) record company name, (v) the record company title number, (vi) the Bar Code Number, (vii) the media type (i.e., cassette tape, audio compact disc, CD-ROM, DAT, etc.). A tally (viii) of the total copies of that particular title sold to date for the last day, week, month and year or for any other period as defined by the system administration is also stored so an immediate comparison of sales can be assessed. A best item number (ix) representing the number one best selling title is also maintained as a separate addressable item in the sales database.

Information retrieved from machines and stored at the CSR can be accessed by record companies. The CSR can also provide information to franchisees via a second computer. This provides record companies with instant access to information. Information can be sent from the CSR by facsimile or through modem-based communications.

Activation dates and deactivation dates (x and xi) are also provided for longevity tracking purposes and to indicate when titles have been removed from the inventory.

The fourth database is the inventory database. This database contains files which link inventory to the title ID file contained in the sales database. The first file provides the (i) number of video files that are linked to the title ID. For example, if a customer wants to select a given compact disc, the inventory database will link that selection to a video file in order for the music video of the selected compact disc to be by at least output monitor 50 and speakers 64 and 66. Any appropriate monitor can be used, including a higher resolution monitor or other monitor including other formats including PAL or SCAM. The video file can be read from CD ROM 54.

In addition to linking the video files for playback, the inventory database also keeps an active inventory of the video files so that the vendor can readily link music videos with their audio inventory's changes, updates or modifications. Audio files (ii) are also linked to the title ID field in order that the vendor can track the number of inventory audio files for a given work's title. In addition, the total amount of inventory contained in the vending machine (iii) is provided. This value, unlike the audio files field, provides a total picture of all inventory, independent of media type for a given title. Hence, if the machine stores CD ROMs, audio cassettes, compact discs, and music videos, among other things, the vendor will have an overall picture of overlaps and redundancies for different media types for a given title.

The inventory database is linked to a CSR-based viewing program so that the CSR operator can view real-time audio and video clips of the titles through the CSR computer 10 and output monitor 12.

Finally, the inventory database, contains a help caller log (iv). The help caller log (iv) tracks all communications between the CSR site 20 and the vending machine 30. All log entries can include audio and video clips taken at the time of the call. For example, if a call is made by a customer, video camera 42 can send to the CSR site 20 a video picture of customer/service personnel querying for help. Similarly, video data provided from video camera 14 at the CSR site 20 can transmit a video response so that a picture-phone type image is employed to help the caller/operator. These digital/audio communications can be stored and logged for later review.

Figure 1B:
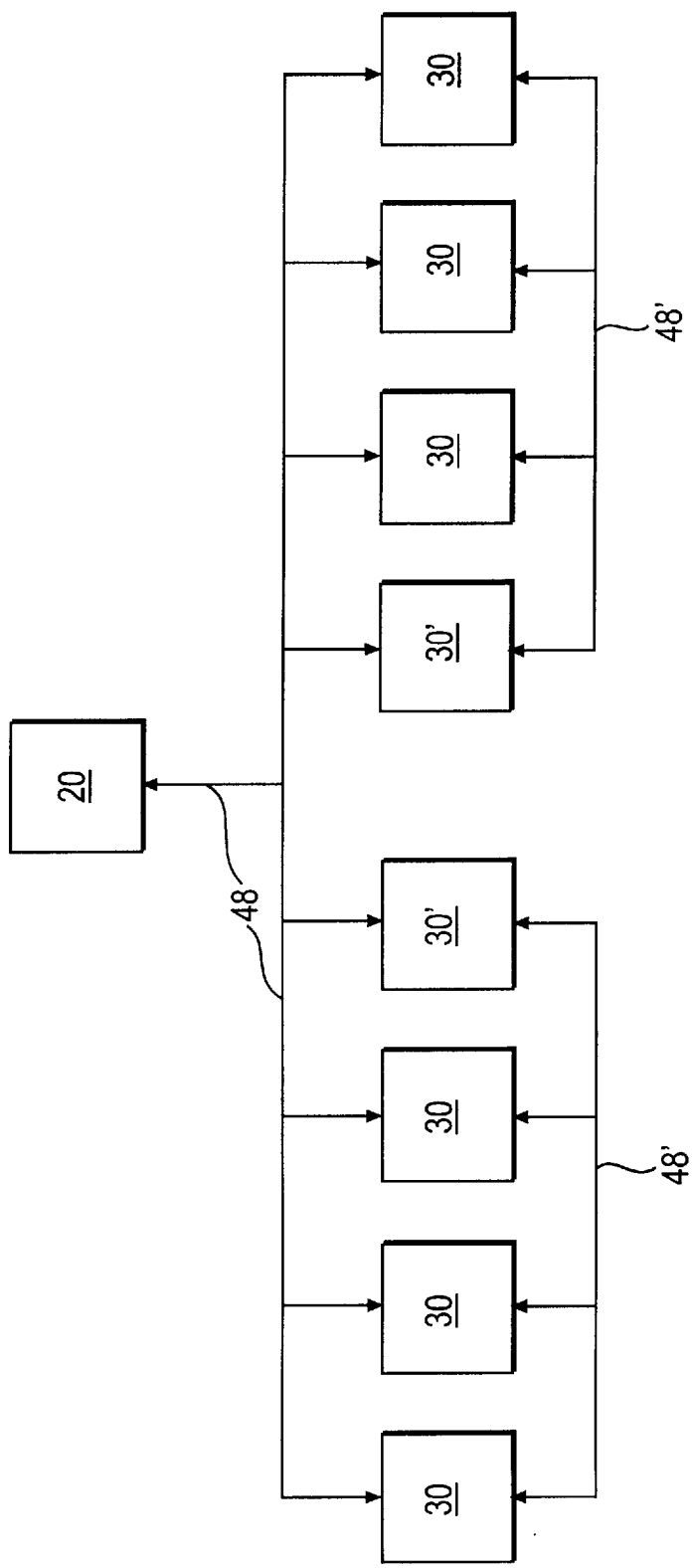
FIG. 1B is a block diagram illustrating an operational feature of the present invention.

It is anticipated that, as the number of vending machine installations grows, transmissions of periodic, e.g., nightly, machine activity and status reports to CSR 20 will cause significant traffic backup and delay. It is therefore contemplated that the vending machines will be grouped by machine ownership, geographically, or on some other bases with one vending machine in each group equipped to serve as a master vending machine 30', as illustrated in FIG. 1B. The vending machines 30 of each group would then transmit their nightly reports over phone lines 48' to their group master vending machine 30', which then assembles the individual vending machine reports into a group report for transmission over phone lines 48 to CSR 20. Also, CSR 20 can send group data to a master vending machine 30', which is equipped to de-compile the group data and then forward machine data to the appropriate vending machines 30 of the group.

Peripherals To Commuter 36

In order to promote the multimedia aspects of communications between customer and the vending machine 30, as well as between the vending machine 30 and the CSR site 20, a variety of other data sources are connected to the control computer 36. Thus, computer 36 may contain a suitable digital video interactive board that delivers still and real-time video information to the computer which then converts that information so that it can be displayed by video monitor 50. This technology permits the recording, file transfer and playback of digital real-time video. Video input can be provided either via camera 14 at CSR 20 or 42 in vending machine 30 or stored video sources, such as CD ROM 44, hard drive 38, or player/recorder 55, which may take the form of a laser disc or CD player 46 or tape player-recorder. While only one player/recorder 55 is shown in FIG. 1A, it will be appreciated that multiple units may be provided, such as various ones of the types just mentioned.

A number of peripherals are connected to interface computer 74 for a variety of purposes. Those peripherals include a card reader 52 for reading information from magnetic or optical credit cards, ATM cards, debit cards, etc., that are used for vending transactions. In practice, after a customer inserts one of these cards into card reader 52, the read out information is saved in the sales database. Once verification is received from a credit card service bureau via modem 40 (credit service bureau linkage not shown), a selected product is dispensed to the customer under the control of computer 74 upon receipt of the authorization information and order data.

The interface computer 74 is designed to provide communications pertaining to the status of inventory, the delivery of that inventory, power supply status, the status of mechanical operations and interactions with customers through a key pad 72 and a currency (bill) acceptor 70.

In the preferred embodiment, the vending computer 74 comprises an Intel 80-186 microprocessor.

Keypad

Figure 4:
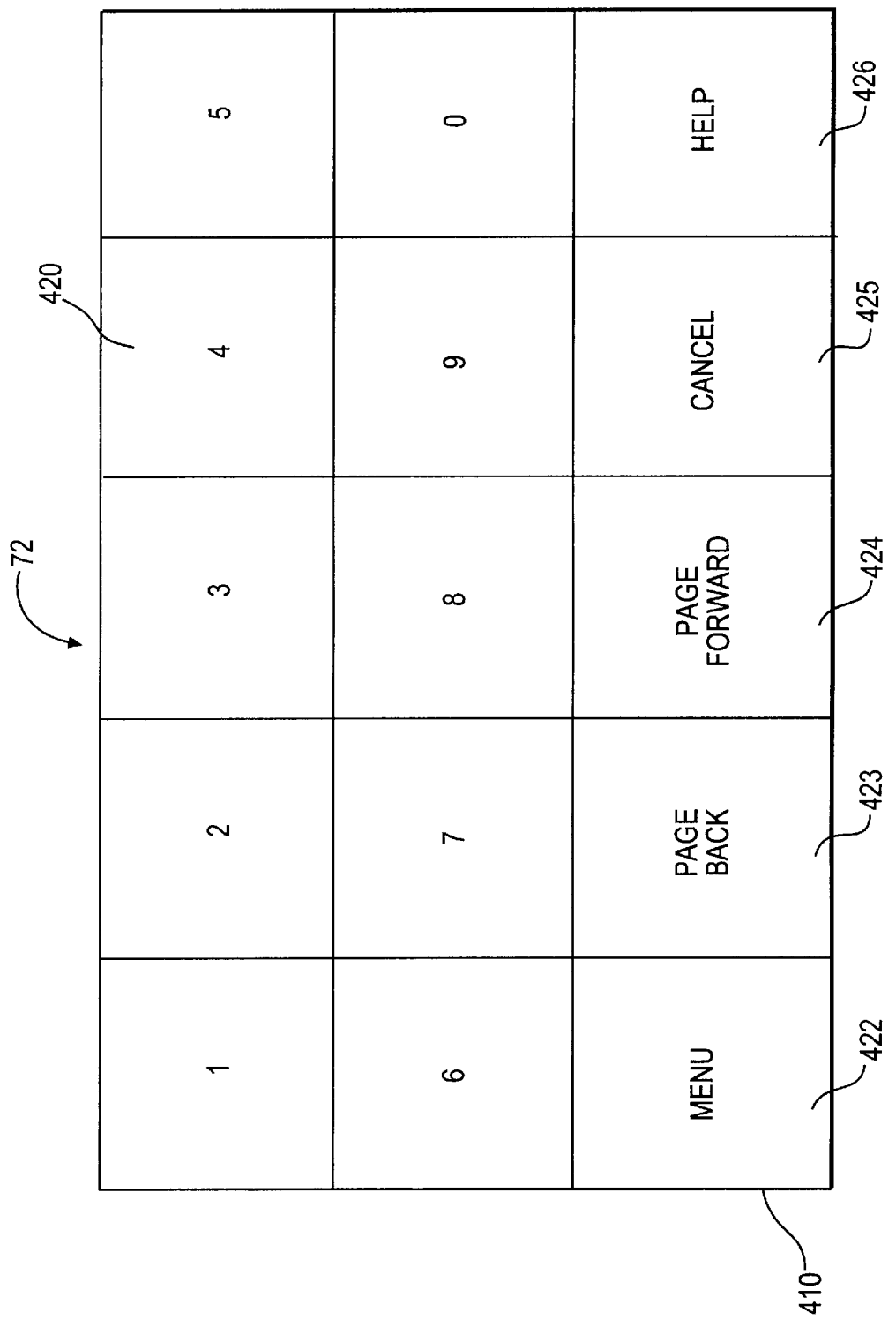
FIG. 4 is a plan view of the keypad 72 shown in FIG. 1.

Referring to FIG. 4, the key pad 72 comprises a series of function keys 410 and a plurality of numeric keys 420. The key pad operations, which will be described in detail below, enable a customer to select a product such as by pressing menu key 422 to activate a menu function and then press key 423 to page back or key 424 to page forward through a products category menu displayed on monitor 50. While browsing the menu, when the customer sees the particular product he/she wishes to purchase, the product code number for that product indicated on the displayed menu, is pressed to initiate the transaction.

For example, the 4 key may be pressed to order a cassette tape player, and the 5 key pressed to order cassette batteries. However, when the 1 key is pressed to order a cassette tape, a menu of titles in inventory is displayed. From this menu, the customer enters the indicated title code number to order the desired cassette. Ordering CDs, music videos for playback, entertainment tickets, debit cards, prepaid telephone cards, and the like would involve the same scenario, menu selection of a product category, followed by menu selection of a particular product in that category. Each menu display includes instructions regarding payment by cash via bill acceptor 70 or credit card via card reader 52. When ordering a debit/telephone card, the customer uses the key pad 72 to select one of various denominations of cards, e.g., 10, 20, 50, etc., dollar denominations, stored and dispensed by debit card interface dispenser 56. The vending machines may also be equipped to print and dispense lottery tickets.

The help key 426 provides several unique functions. First, the help button automatically connects the customer to the CSR 20 human operator in order to answer questions spoken by a customer via microphone 43. That is, pressing the help key 426 initiates a telephone call through computer 74 and teleswitch 32 and over telco 48. The call is connected through teleswitch 2 to the microphone/speaker 24 adjacent to the CSR operator at CSR site 20. The CSR operator then has the first option of viewing a still frame or real time video picture of the customer taken by a video camera 42; the video image data being fed through modem 23 and teleswitch 2 to CSR computer 10 and displayed on monitor 12. The CSR operator can then switch to voice mode and talk to the customer microphone/speaker 24 and machine speakers 64, 66. The customer may talk back to the CSR operator via machine microphone 43.

Another feature of the help button is that it initiates refunding transactions between the CSR and the customer. Furthermore, by activating the help button, the customer can inform the CSR that he/she has received the wrong product so that a refund procedure can be initiated. The help button also assists the customer in selecting a product when he/she inserts currency and does not receive a product.

Returning now to FIG. 1A, the computer 74 also operates in conjunction with the bill acceptor 70. Specifically, the computer 74 contains standard hardware and software for receiving currency and providing change for such currency to the customer. In addition, a product door sensor 78 and an out-of-product sensor 76 are provided. Details concerning these sensors will be discussed below. The system also includes a power supply 80 for converting and distributing utility power to levels for powering the many machine components. Any power failure is signalled by power service alarm 86.

Audio Source Switch 68

Figure 2:
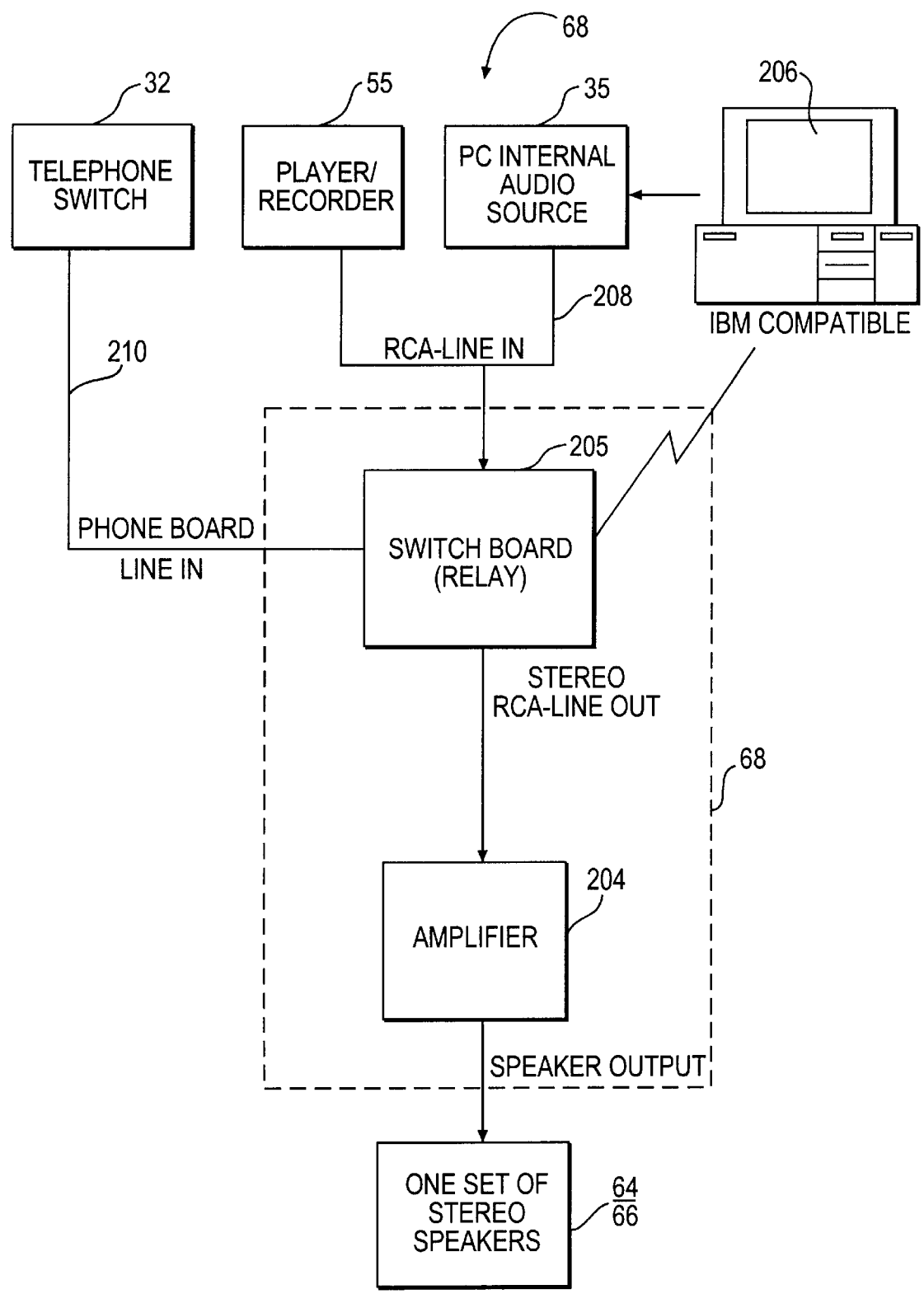
FIG. 2 is a block diagram of the audio source switch 68 as shown in FIG. 1A.

FIG. 2 represents a block diagram illustration showing the components comprising the audio source switch 68, which is shown in FIG. 1A. In particular, the audio source switch (shown by the dotted line in FIG. 2) includes a relay board 205 connected to three sources of audio information: the telephone switch 32, the player/recorder 55, and an internal audio source 35 in computer 36. Additionally, the PC internal audio source can receive audio information from other destinations, including any external IBM-compatible computer 206 along with the various memory drives associated with the computer 36, e.g. the hard drive 38, the CD-ROM drive 44, or the video camera 42 via interface computer 74. The player/recorder and the internal audio source are connected through an RCA audio line 208 to switch relay 205. In addition, the telephone switch 32 provides a communications link to the switch relay board 205. The telephone switch, as previously described, receives and sends audio communications to the CSR 20 along with other addresses located on the telephone line 48 (other vending machines, external antenna, wide area network, or local area network, etc.).

All audio communications are transferred through computer 36 to the relay. The relay is activated by signals sent across the respective lines 210 or 208. While activated, the audio information is converted from digital to analog form, amplified by an amplifier 204 and provided as speaker outputs to the set of stereo speakers 64/66. Although not shown, the audio amplifier can have other outputs provided to externally-mounted speakers, or to other means which can communicate the amplified audio signal (e.g., antenna, transmitter).

Machine Operations

Figure 3A:
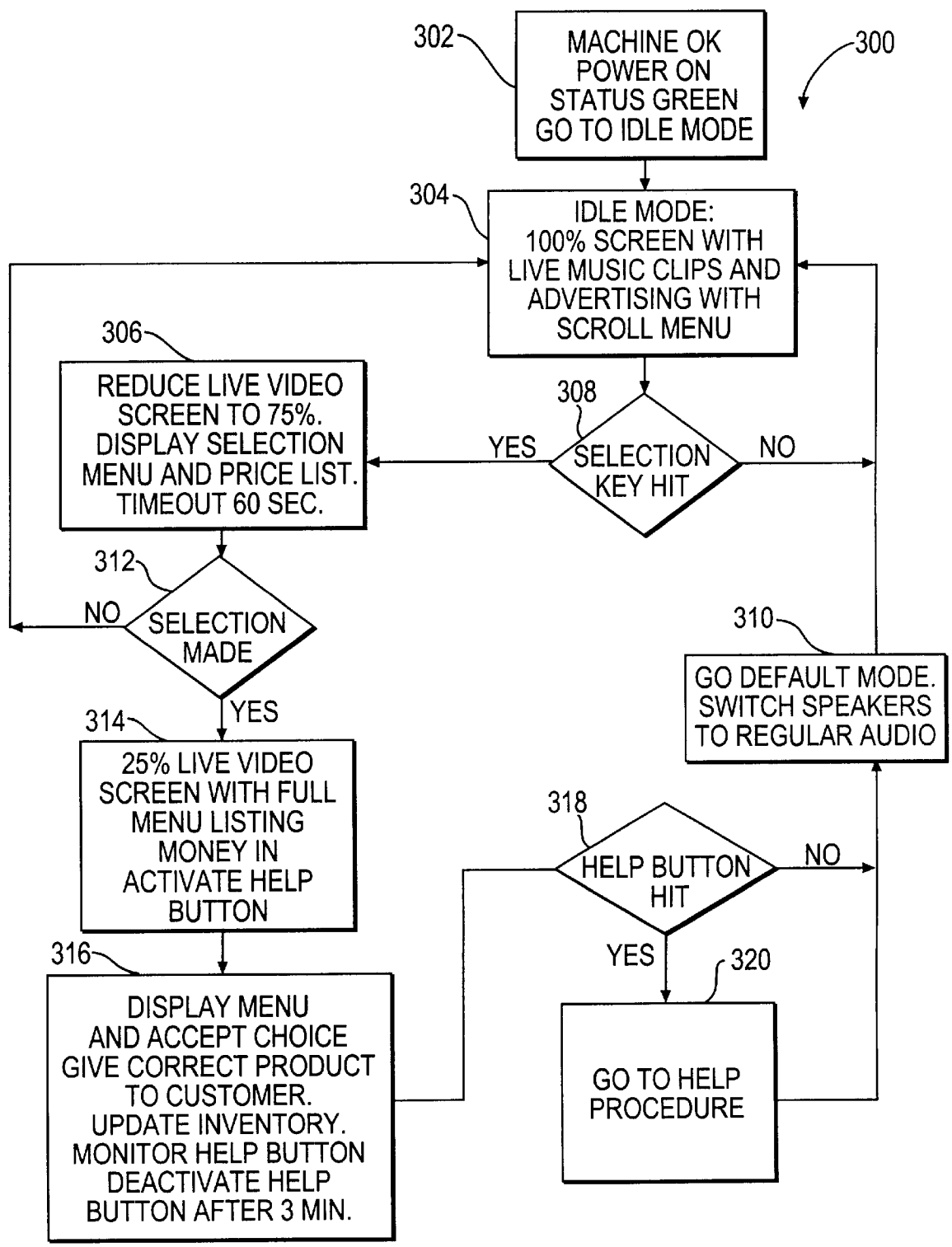
FIG. 3A is a software flow diagram showing an overall graphical user interface operation for vending machine 30 of FIG. 1B.

FIG. 3A illustrates an operational flow chart of a customer interface main algorithm 300. In particular, at step 302, the machine status is initially checked to determine if the machine is available for power-up. If a self-diagnostic check indicates that it is, then the power-on condition occurs and a power-on status is communicated from CSR 20 to the computer 74 over a telcoline 48. The status is also provided to the CSR computer 10. On power-up, the machine enters the idle/default mode 304.

The default mode is designed to normally provide baseline entertainment throughout, unless a customer purchases a music video for direct view. As designed presently, the machine plays music clips and/or video music selections interspersed with advertising videos in a continuous loop. These videos are displayed across 100% of the monitor 50. A scroll menu is also seen on the monitor allowing the customer to make an initiation keystroke. Play may originate from player/recorder 55 CD ROM 44 and/or hard drive 38, and sequencing is controlled by computer 36. Periodically, the computer 74 tests the keypad 72 in order to determine whether or not a selection key has been pressed at step 308. If not, the operation loops back to step 304 for the next periodic test.

In the event that a selection key is depressed, a menu and price list are first displayed to the customer so that he/she can select a music video, a compact disc, a cassette, or other selection, as described above. At this point, video playback continues to entertain the customer. However, the display of the video sequence is reduced to 75% of the monitor screen in order to accommodate selection and price menus. If no selection is made within, for example, sixty seconds, (although anytime period can be programmed) of the last keystroke, the system loops back automatically to idle mode 304.

Once a selection is made by the user (step 312), a time-out for 30 seconds (or any other time period) occurs in the event the operator wishes to cancel his or her transaction by pressing cancel key 425 (FIG. 4). A selection test is then made at Step 312 to determine whether or not a selection is valid. If the selection is not valid, the machine provides an appropriate message or an invalid selection message and returns to the idle mode. By the same token, if the selection is incomplete, the idle mode 304 is re-entered.

In the event that a valid transaction is made, then a credit card or cash transaction is processed at step 314. For credit card or debit card transactions, information from the card is read from card reader 52. The read information is then stored in an appropriate memory of computer 36. The credit card information is then sent, on a high-priority basis, through the modem 40 over a telcoline 48 to the appropriate credit card/debit card approval network (not shown). While the credit/cash transaction is ongoing, the video display remains on the monitor. However, the video display only occurs on 25% of the entire monitor. Other functions in Step 314 will be described in further detail with reference to FIGS. 3B through 3D. Once payment has been accepted, the system then enters Step 316 where the choice is communicated to the customer. The mechanical operations are then activated so that the product is delivered to the customer. The computer 74 then immediately updates the inventory stored in either its internal memory or hard drive 38 of computer 36 in order to indicate the sale of one item, and the identity of that item. During ordering and delivery, the help button is monitored in order that transaction problems can be immediately addressed by the vending machine directly, or by the CSR operator. Details concerning the help operations will be discussed below.

While the transaction occurs, the help button is tested at Step 318. If the help button is activated, then at Step 320, help processing occurs, as will be describe in further detail below in FIG. 3B and 3E.

If the help button is not activated or the help procedure is completed, then the system defaults at Step 310 to the idle Mode 304.

Figure 3B:
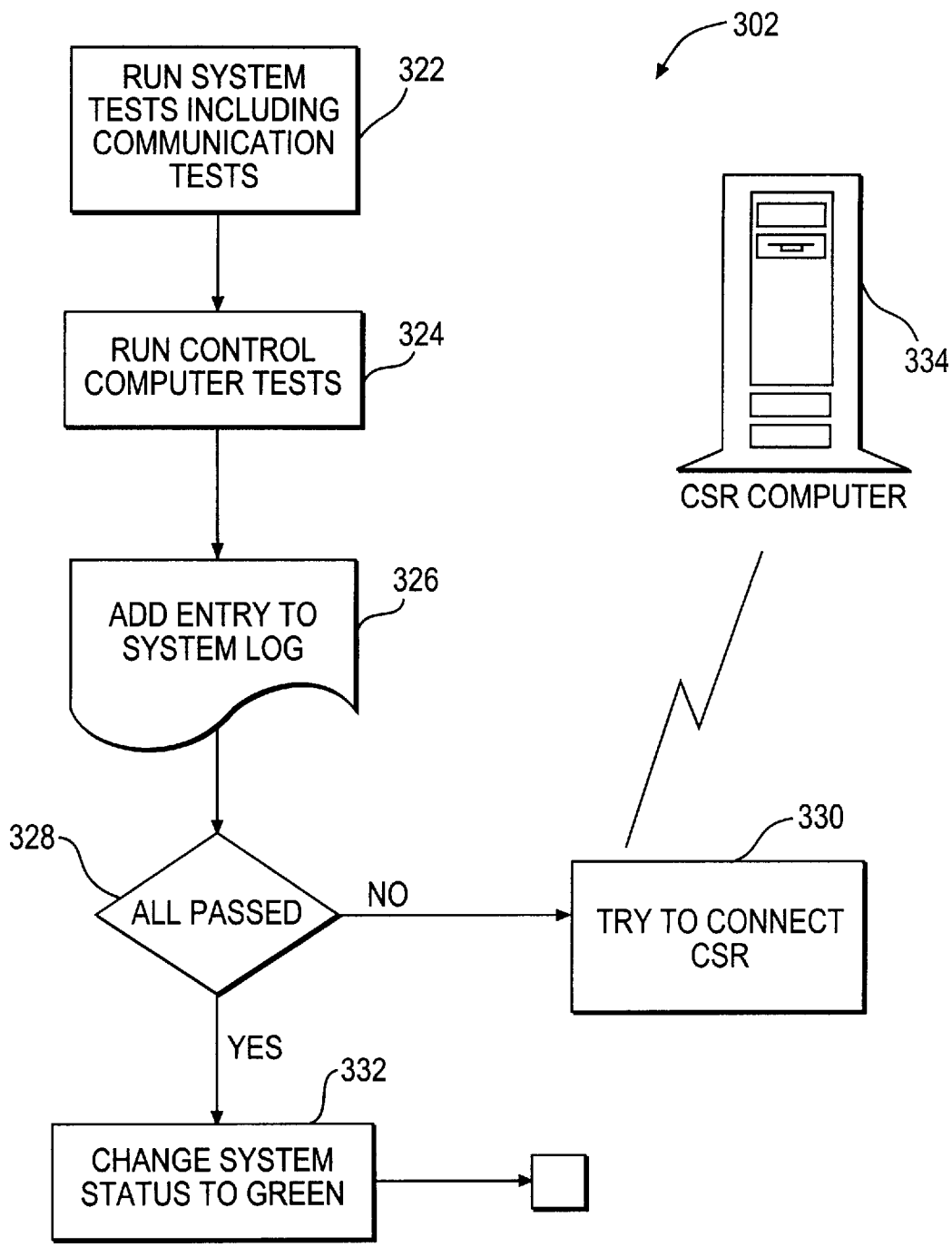
FIG. 3B illustrates a startup routine for the system of FIGS. 1A and 1B.

FIG. 3B is a flow chart that describes, in further detail, Step 302 discussed above with reference to FIG. 3A. As shown, the system runs initial tests to determine whether or not the vending machine is connected and is in proper condition for power-up. Tests run by the system include the CSR computer 10, testing the teleswitch 32, the video computer 36, and the interface computer 74. Control tests include an inventory review to determine discrepancies, a check of major software routines to determine if they execute properly, power supply tests, a test run of all sensors to determine whether or not they operate properly, and communications tests across the telephone and communications network. Protocols, handshakes and data transmissions are also tested. Those tests can include, but are not limited to: testing the status of all peripherals, parity code data checks of the memories, etc.

Once the control tests are completed, the status of the system is maintained in a system log 326. The system log status is communicated to the CSR Site for storage in CSR memory 6. The system is then tested to see whether the tests at steps 322–326 have been passed. If so, then the system status is changed to "green", which indicates the ability to power-on vending machine 30. If the test at step 328 indicates a test failure, then the system automatically tries to connect to the CSR site 20 at step 330 Once communications are established with the CSR Site diagnosis and corrections to the machine can occur remotely. This occurs through intervention by the CSR site operator who can remotely test the systems automatically via the CSR computer 10 or vending machine computer 74. If remote diagnostics do not correct the issue, then an operator can be called to replace failed components.

Figure 3C:
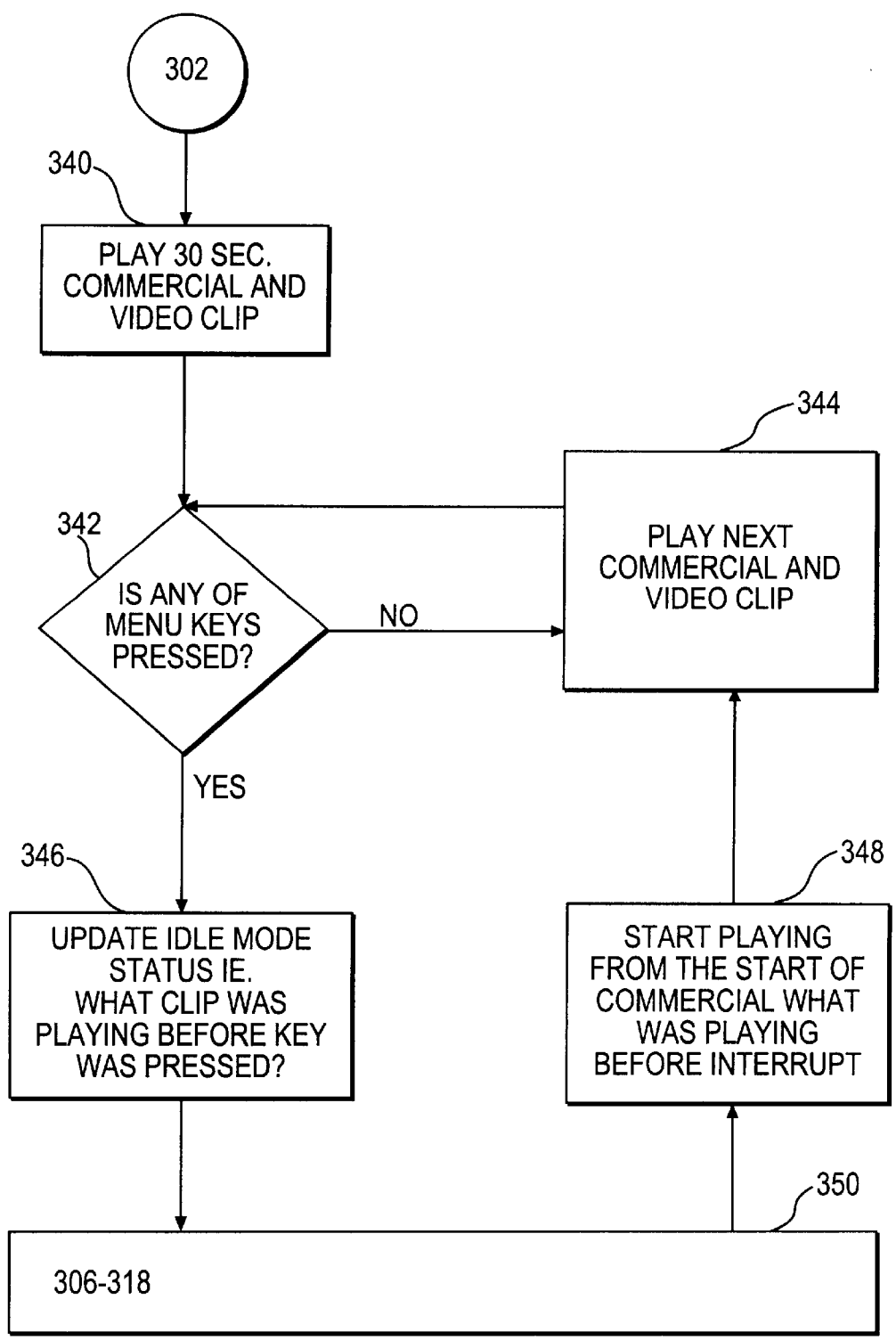
FIG. 3C illustrates a display select video clip sequence subroutine included in FIG. 3A.

FIG. 3C is a flow chart illustrating the operation of the idle mode 304 in FIG. 3A. The idle mode is entered upon power-up of the vending machine in step 302. Once entered, the idle mode first plays a 30-second commercial and video clip in step 340. During this period, keypad 72 is tested at step 342 to determine if either of the menu keys have been pressed. If the test 342 indicates activation of the keypad, then the idle mode status is updated so that the computer saves the location of the next video clip to be played in the event a music video is selected to be played out of sequence (step 346). The system then enters the ordering sequence, which is represented by steps 306–318 in FIG. 3A. In the event that no menu keys are pressed, then the next video clip/commercial is played at step 344.

Figure 3D:
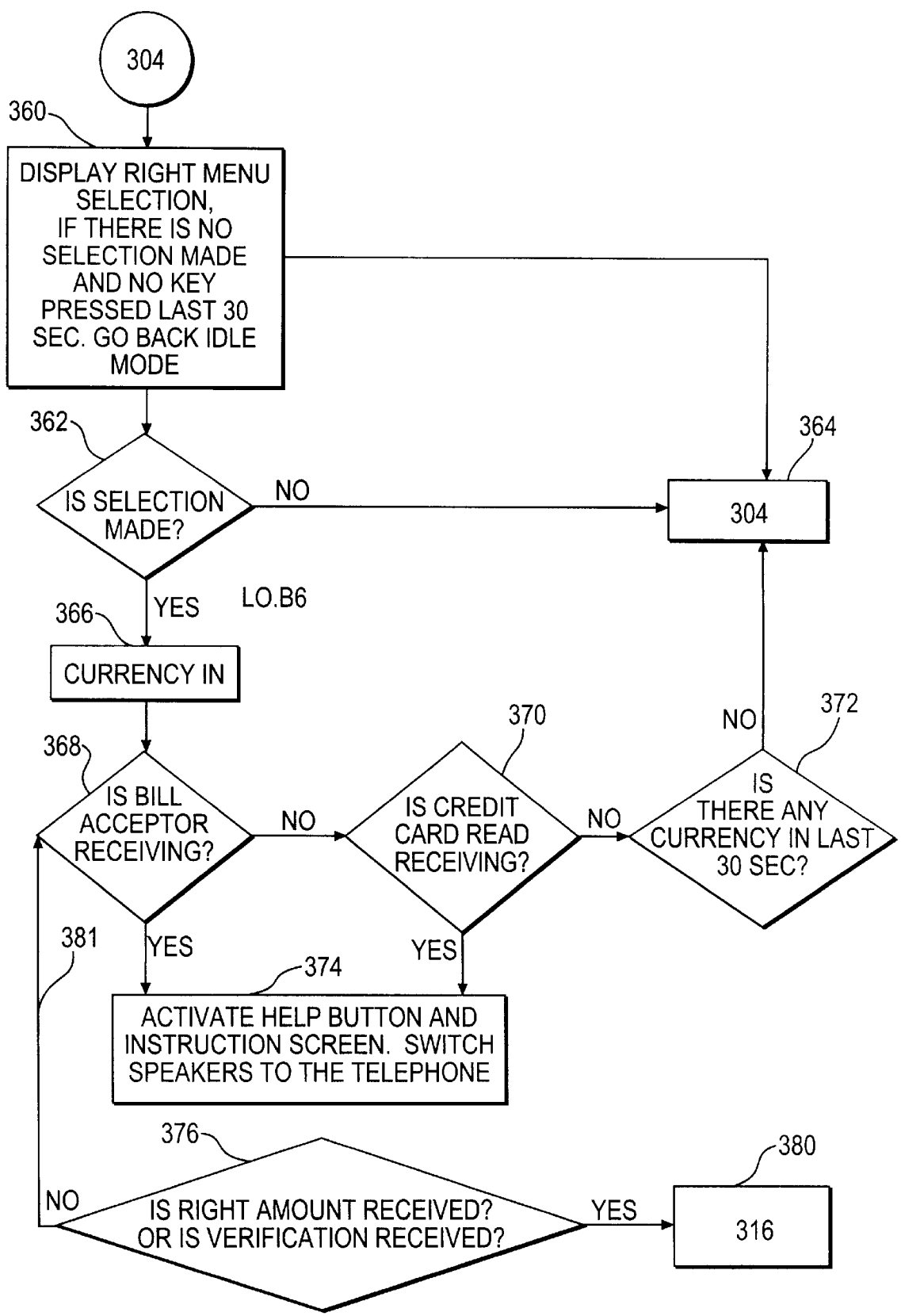
FIG. 3D illustrates an end product display and help subroutine included in FIG. 3A.

FIG. 3D represents the order mode represented by steps 306–314 and the help button tests represented by step 318 in FIG. 3A. The order sequence is entered once the idle mode (step 304) is exited by virtue of the user selecting a purchase option using keypad 72. At step 360, a determination is made whether or not a selection key has been pressed. If it has not, then after 30 seconds, the system returns to the idle mode 304 at step 364. The selection test then occurs again after the menu choices are displayed at step 362. If this test indicates no numeric product selection key has been activated, then the idle mode is entered again. However, if a selection is entered, then at step 366, the method of payment subroutine is entered. If actual payment is not received within 30 seconds, then the system defaults to the idle mode 304.

In the event that both the bill acceptor and the credit card acceptor indicate they are receiving payment, then the system activates the help mode which switches the system to the teleswitch capability. This capability allows the CSR site 20 to determine whether or not the right amount of cash has been received to verify reception of cash. In addition, the CSR computer 10 can determine whether a credit card or debit card has been entered, whether the customer pin number is correct, and whether a valid charge-accept condition is provided by the external credit card service bureau computer to the vending machine 30. Once the credit/cash operations indicate that the right amount has been received, or verification has been made of the transaction, then the product delivery sequence 316 is activated at Step 380. In the event that the transaction amounts for verification are not received, the system loops back to step 368 to accept additional cash, or to indicate to the customer that there is need for her/him to re-enter the credit card.

Figure 3E:
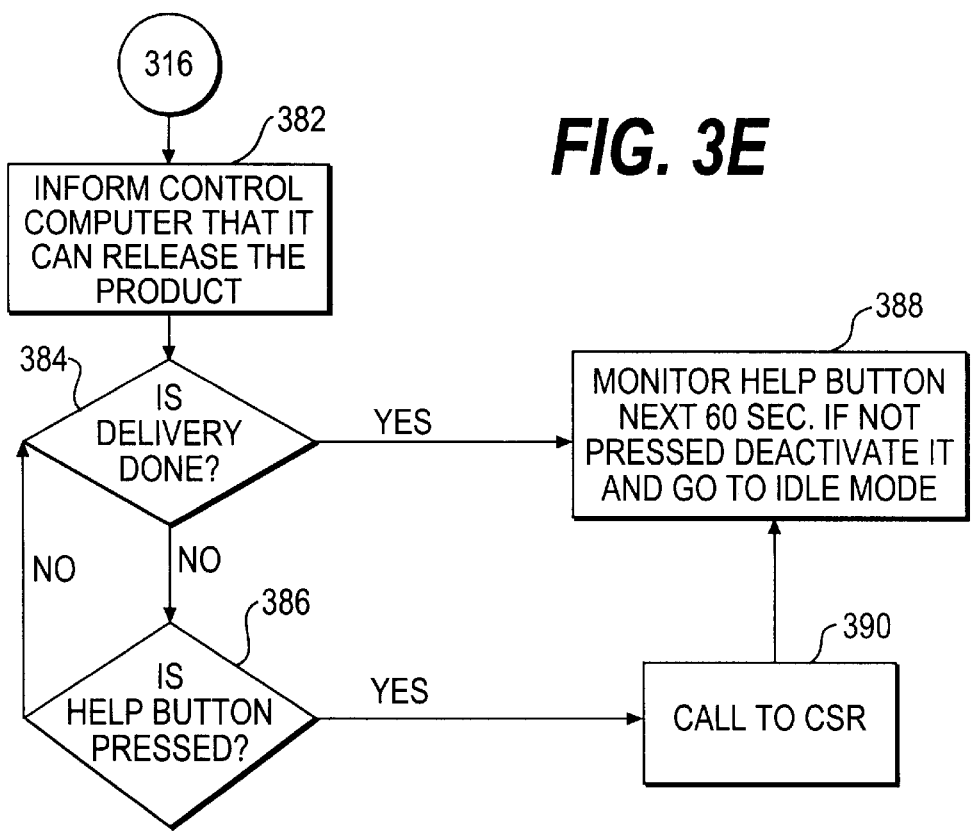
FIG. 3E illustrates a subroutine for releasing product and assisting a customer for non-delivery also included in FIG. 3A.

Step 316 and the help button step are also shown in FIG. 3E. Operations of step 316 include step 382, initiate retrieval from inventory storage of the selected and paid for product under control of interface computer 74. That is, the stepper-motor interface 91, as shown in FIG. 1A, is activated and the stepper-motors 92, 93 and 94 are directed to move the product platen (which will be described in further detail below) to retrieve the selection product from inventory for dispensing to the customer. The product delivery is performed by the x,y,z mechanism, which moves in three coordinate planes to retrieve and then convey that product to a delivery door. Sensor 78 is located at the site of the door to signal arrival of the product in the product chute behind the delivery door. Reception of that signal is tested periodically by the interface computer 74 at Step 384.

Once the delivery completion step has been indicated at step 388, the help button is monitored to determine whether or not an incorrect delivery or problem in delivery has occurred. If no help button has been activated, then at step 388, the idle mode 304 is re-entered. In addition, the transaction log is updated by the interface computer 74 to indicate a change in inventory, a delivery of product and/or a complete transaction. While delivery is ongoing, the help button is routinely monitored at Step 386. If the help key has been pressed, then an immediate call to the CSR site occurs at step 390. If not, the help key is monitored for an appropriate time-out period, e.g., three minutes.

Figure 3F:
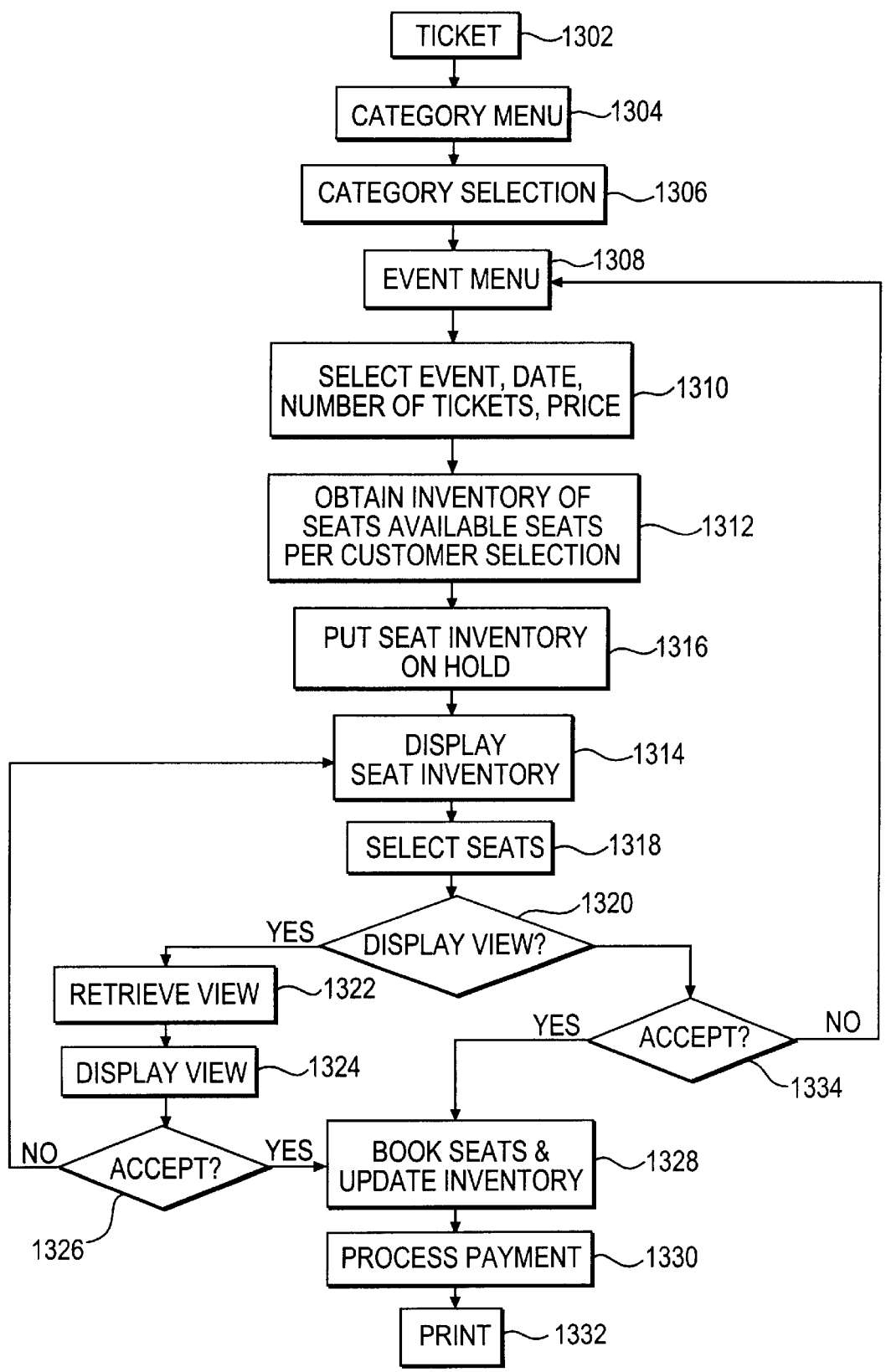
FIG. 3F is a flow chart illustrating a ticket vending capability of the vending system of FIGS. 1A and 1B.

The flow chart of FIG. 3F illustrates another capability of vending machines 30. Should a customer wish to attend an entertainment event, such as a sporting event, theatrical or musical performance, movies, etc., the appropriate ticket order numeric key is pressed in step 1302. This selection is forwarded by vending interface computer 74 to computer 36, which responds by displaying on machine monitor 50 a menu of entertainment events categories for which tickets are available through the vending machine (step 1304). Following menu instructions, the customer makes an event category selection using key pad 72 (step 1306). A menu of ticket-available events in the selected category is then displayed (step 1308). The customer then, following menu instructions, makes a series of numeric key strokes to select, event, time/date, and number/price of tickets (step 1310). Computer 74 then communicates, via teleswitch 32 and a telco line, with a ticketing service to obtain a current listing of available seats meeting the customer selection criteria (step 1312). This seat listing is displayed on monitor 50 as a menu to the customer in step 1314, and a temporary hold order on the listed seats may be communicated back to the ticketing center (step 1316). From this listing and following menu instructions, the customer enters a seat(s) selection using appropriate numeric keystrokes (step 1318). The customer is then asked whether he/she desires to see one or more representative views from the selected seat location to center stage, home plate, center court, etc., as appropriate for the selected event (step 1320). If the customer makes a "yes" keystroke, interface computer 74 commands video computer 36 to retrieve from a database stored in CD ROM 44 or hard drive 38 video data of the representative view (step 1322).

The video data of the representative view is displayed on monitor 50 for the customer's consideration in step 1324. In step 1326, the customer uses an appropriate key stroke to indicate whether the selected seat(s) is acceptable. If not, the procedure loops back to step 1314, allowing the customer to make a different seat selection (step 1318) from the menu display and, if desired, observe the view from that seat location (step 1324).

When the customer indicates acceptance of a seat location in step 1326, the selected ticket(s) is worked in step 1328 (ticketing service notified to remove selected tickets(s) from inventory), ticket payment is processed (step 1330) via bill acceptor 70 or card reader 52 (FIG. 1A) and a ticket(s) or willcall receipt is printed by printer 90 and dispensed to the customer in step 1332. As also indicated in FIG. 3F, the customer may decline to see a representative view in step 1320 and accept or reject the tickets in step 1334. If acceptance is indicated, the accepted tickets are booked (step 1328), payment processed (step 1330) and a ticket/receipt is printed and dispensed (step 1332). If rejection is indicated in step 1334, the procedure loops back to event menu display step 1308, giving the customer the opportunity to select a different event. It will be understood that the customer can end the procedure at anytime by pressing cancel key 425 (FIG. 4), perhaps to restart the ticket procedure at step 1302.

It will also be appreciated that a group of vending machines 30 in a particular geographical area may be allotted blocks of seats to events for which tickets may be printed by machine printers 90 under the oversight control of a CSR 20 where a seat inventory is maintained. Alternatively, the vending machines of the group may communicate with each other directly or indirectly via the CSR to maintain a current ticket inventory at each vending machine.

It is also envisioned that the vending machines may also function as an off-track peri-muutiel machine linked to race tracks and off-track betting parlors. Bets may be made through the vending machines and tickets printed by machine printers 90. Machine monitors 50 may display live and delayed telecasts of races selected and paid for by customers.

Figure 3G:
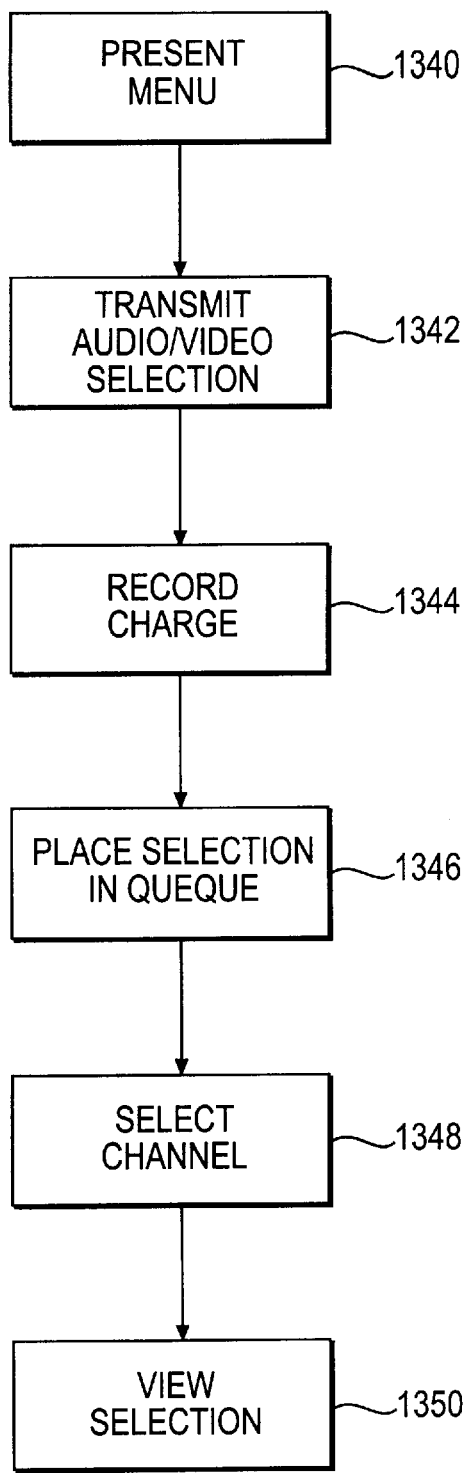
FIG. 3G is a flow chart illustrating a remote vending capability of the vending machine of FIG. 1B.

A further capability of vending machine 30 is illustrated in FIG. 3G. It is envisioned that particularly attractive sites for vending machines 30 are in hotels. In this case, computer 36 may be connected via external out terminals 54 and 56 in FIG. 1A to the hotel TV cable, such as to transmit the same audio/video programming over this dedicated hotel channel as are applied to machine monitor 50 and speakers 64,66. Alternative, computer 36 may be equipped to transmit different programming over the hotel TV channel. In addition, teleswitch 32 may be additionally connected to a hotel teleswitch (not shown), permitting phone line communications between computer 74 and hotel guests for selecting products, such as playback of selected music videos over the hotel channel to hotel room TV receivers.

When this capability is implemented, a menu of music video selections is provided to hotel guests, as indicated in step 1340. This menu may be presented to hotel guests in a variety of ways. For example, the menu may be scrolled across the bottom of current programming when the room TV is switched to the hotel channel. The menu may then be displayed in full frame at schedule intervals, and during programming pauses, such as during the time required to queue up the next selected music video in player-recorder 55. The menu may be transmitted over a separate hotel TV channel along with other menu items of hotel activities and services. Alternatively or additionally, the menu may be in hard copy form left in the hotel rooms as part of the hotel guide and/or available at the front desk, in the lounge and restaurant, or at the concierge/bell captain desk. Also the menu may be printed out by machine printer 90 in response to a key pad entry. Further, computer 36 may be programmed to transmit the menu over the hotel phone line to an in-room facsimile in response to a machine phone request.

As indicated in step 1342, having made a music video selection from the menu, the guest, using the room phone, calls the vending machine and keys in the appropriate selection code, which is transmitted in DTMF signal format to computer 74 via a hotel room phone line. In step 1344, computer 74 contacts a hotel computer (not shown) via teleswitch 32 to enter the appropriate charge on the guest's running hotel bill. The guest selection is placed in the selection queue in step 1346. The guest switches the room TV to the appropriate hotel channel (step 1348) and awaits playback of the selected music video by player/recorder 55 (step 1350) under the control of computer 36.

It will be appreciated that the external audio/video out terminals 56/54 may be linked to a local cable company station, such that vending machine-produced audio/video programming may be transmitted over a cable channel to cable subscribers. Programming selections would be called into the vending machines by cable subscribers, and charges would be made to their phone numbers.

Furthermore, the audio/video out terminals 56/54 may be connected to TV receivers distributed throughout a restaurant or lounge for convenient viewing by patrons.

System Operations

Having described the architecture of the vending system of the invention, typical and abnormal operations of the system will be described below in further detail.

In a normal operating sequence, a customer walks up to the vending machine and watches video clips, or commercials retrieved from CD ROM 44 or hard drive 38, and makes no keypad entry. This takes place during the machine's idle mode 304 in FIG. 3A. In the event that the customer wants to use the machine, for example, to select a compact disc product, this selection is displayed at step 306 and the user then pays for and receives the product. A new customer can use the machine to select an audio cassette or a cassette player with headphones or batteries. As another option, the customer can merely use the vending machine as an entertainment device that plays music videos. As previously noted, music videos are played in a predetermined sequence. However, site operators may elect to have the vending machines not present music videos, unless of course, a customer selects and pays to view a particular music video, which then will be played in selection sequence. The operational sequence is the same as above, except step 316, does not occur. Instead, the player/recorder 55, if a tape unit, is activated to automatically fast-forward or rewind to the beginning of the customer-selected music video for playback. Alternatively, the music videos may be stored in CD ROM 44 and retrieved in sequence (or selection) by computer 36 for display on monitor 50.

A further product purchase scenario occurs when the customer walks up to the music vending machine 30 and watches how to use the machine, along with advertising. The customer may then select a product, such as a compact disc, whereupon a menu of choices of available compact disc titles are provided on the monitor 50. A customer then enters the desired disc number on keypad 72 that he or she has selected to buy. Once selected, the customer is prompted for a payment type. If the customer inserts money, the customer is constantly prompted until the correct amount has been received. If change is needed, the machine can provide it. Once the change has been received, the customer is told by the monitor to stand by and the products are delivered. The machine then automatically logs the transaction. During this entire transaction, the sequence of video clips and commercials continue to play without interruption.

A similar operation occurs if the purchase is made by credit card. In this event, the customer elects a credit card method of payment. He or she is then prompted to swipe the card through the cardreader 52. Once a valid read is made, the customer is then told that the credit card transaction is waiting for approval. A standby message is thus displayed by monitor 50 while the transaction verification approval process occurs. Once complete, product retrieval and dispensing sequences are initiated by computer 74, and the transaction is logged.

With respect to abnormal operations, a customer can select a product, insert currency, and receive the wrong product. If that occurs, then a customer is prompted by a message on monitor 50 to press the help key. The help key will provide the customer with the possibility of a refund authorization. There is also the possibility that the customer will select a product, render payment, and not receive any product. In this case, the customer can also press the help key to initiate contact with the CSR Site so the CSR site operator can provide authorization for a refund to the customer's credit card. However, in the event that the customer pays by cash, and presses the help button, the system only gives the option of selecting a different product. In this event, a refund will be sent by mail and a receipt will be provided by the vending machine printer indicating this.

Finally, in the event that the customer selects a product, doesn't receive the product, and is not able to operate help key, a help condition will automatically be generated by the vending machine, which will cause CSR operator to communicate with the user through the speaker-microphone and/or SVGA monitor. In addition, such communications include a video display of the CSR operator's face on monitor 50. In the event the user simply forgets to activate the continuously functional help key, the system will generate an automatic "help" signal at 80 seconds after non-delivery of the product to the user. A non-delivery time-out is 90 seconds from the time the order entry key is depressed or payment was approved (whichever is later).

Another fault condition occurs when a physical disconnect between telco 48 and the vending machine 30 occurs. The system also includes a tilt sensor 82 which when activated, indicates a communications break or spurious movement of the vending machine 30. The power service alarm 86 also incorporates a sensor which, when power is lost or interrupted, immediately sends an alarm to the CSR site 20.

Other abnormal operating conditions can be resolved by the CSR representative. If the customer presses the help key when the product is not delivered, the customer service representative will vocally answer the telephone call through the speaker microphones, and the CSR monitor 10 and machine monitor 50 will provide video phone communications. When a communications link is established, the CSR operator can switch to a data mode so as to access the vending machine 30 databases in order to determine machine status and inventory. In addition, the CSR operator has the option of viewing still frame or real time video pictures of the customer at the vending machine site. The CSR operator can also remotely trigger the vending machine 30 to deliver the product to a customer while on line, and then update the database record of the incident for future reference. A franchisee can also be notified by the CSR representative in order to provide that franchisee information about when and where delivery failure occurred so that the franchisee can pinpoint and service any problems with the machine.

In certain situations, the CSR site cannot remotely activate the vending machine 30 and deliver product. In this situation, the CSR operator can offer a customer a refund option either by mail or by printing a credit refund at the machine site. The mail refund would involve a currency refund i.e., a check sent to the customer. A machine refund could be a credit authorized through the customer's credit card number, although debit card or other conventional CAT, ATM type refunds can occur.

The CSR 30 also may respond to alarm conditions. For example, if the telephone line 48 is disconnected, an internal alarm is sounded at the vending machine 30. When telephone service is restored, the franchisee is then automatically called by the CSR computer 10 regarding the problem. Once an operator has re-connected the telephone line, the machine automatically calls the CSR to reset the alarm via DTMF communications.

A tilt alarm may operate in a similar manner. If an unauthorized person tilts or moves the vending machine and the tilt sensor switch 82 senses such movements, the vending machine, through computer 74, automatically calls the CSR and sends a pre-identified DTMF code. The CSR operator then has the option of viewing still frame or real-time video pictures provided by video camera 42 of activities occurring at the vending machine 30 site. The CSR operator then has a variety of options which he/she can take including shutting off the alarm, calling the franchisee, calling the landlord's personnel, calling a security service or police, no action at all, dealing with the person at the machine, hanging up, etc. the tilt switch sensor function or the help key may additionally wired out to a pedal switch operable by a machine site operator to summon the CSR operator in the case of a robbery. The CSR operator would then notify the police. In the meantime the player/recorder 55, video camera 42, and microphone 43 may be activated to make an audio-video recording of the crime scene activities.

As mentioned above, vending machines may be equipped to receive facsimile transmissions. This capability could be utilized, for example, as follows. A business traveller is advised by phone that an important document has been received at his/her office. By arrangement, the document may be transmitted directly, or indirectly through the CRS 20, to a particular vending machine 30 known now (or soon) to be readily accessible to the traveller. That vending machine would then store the facsimile document until the traveller arrives, and then, upon appropriate key pad entries and payment, the document is printed out by printer 90 and dispensed to the traveller.

TeleSwitch 32

Figure 5:
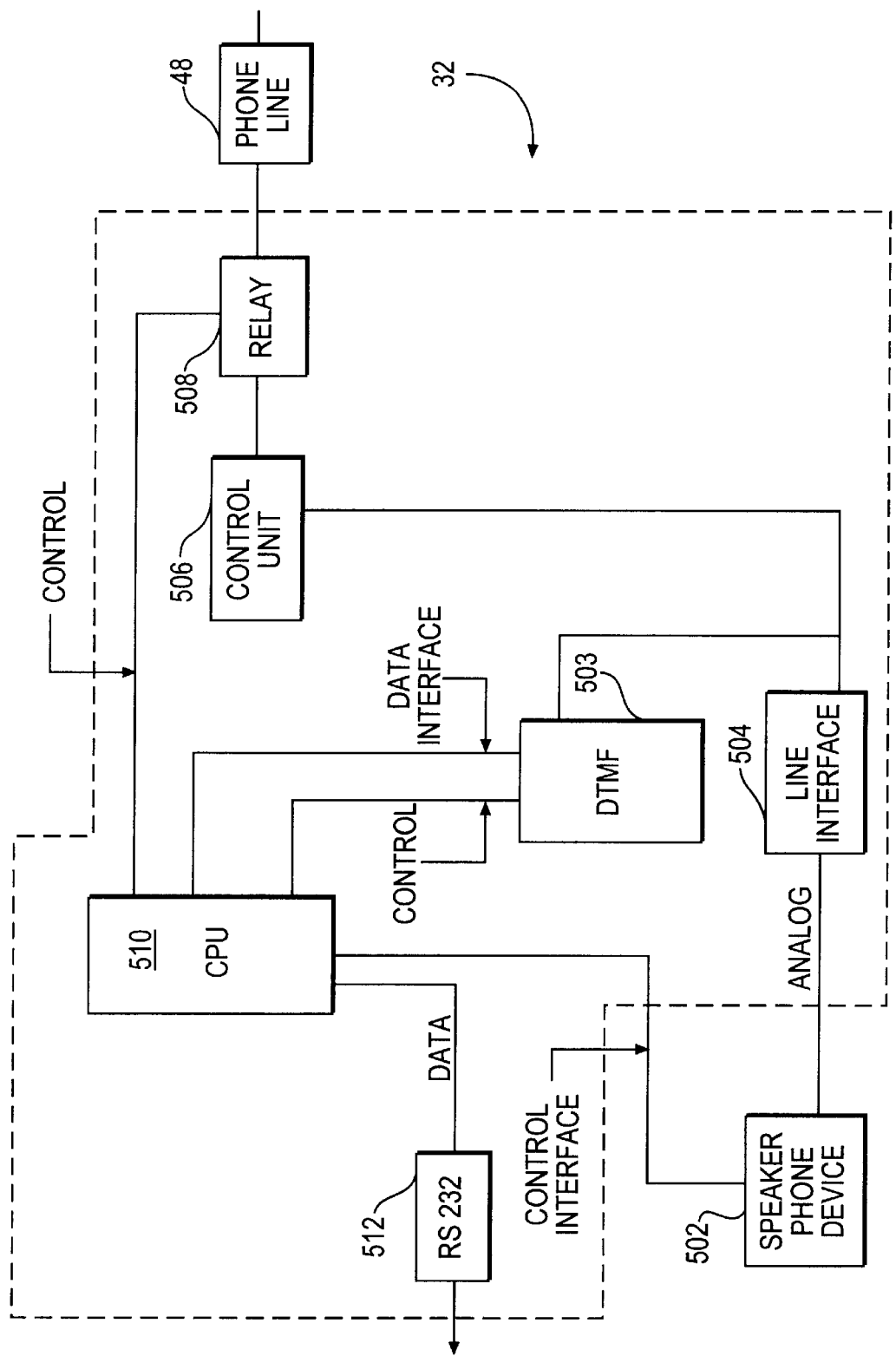
FIG. 5 is a schematic block diagram of the components of teleswitch 32 shown in FIG. 1.

FIG. 5 illustrates details relating to the teleswitch and telephone board arrangement 32 configuration. As shown by the dotted lines, the teleswitch 32 is connected to a telephone board CPU 510, as well as to a speakerphone device 502. The teleswitch unit includes a dual tone modulated frequency unit 503 which is adapted to receive control signals from CPU 510. The teleswitch is designed to intelligently switch between voice and graphics, text and video (real time and still image) and any other data communications. The DTMF device 503 is controlled to operate in two modes by the CPU 510. The first mode, known as on-line, is the transmission mode and the second mode, known as off-line, involves voice transmissions.

A control unit 506 receives digital signals from a line interface 504, amplifies and forwards those signals to the relay 508. The relay, in turn, switches communications to the CSR site. In the event that data is to be transmitted, an RS-232 device 512 provides an interface for effecting data communications to and from control computer 74. As a consequence, the telephone switch device is designed to automatically switch between voice and data. This telephone board is powered by a 12-volt direct current power supply and is connected to a modem 40. The computer modem connection is then established via the telephone network between two computer modems when both are switched to voice mode. Voice communication switch back from a data mode may be achieved by pressing the help key or by connection of a standard telephone pad to the RJ11 connector of modem 40 for voice communications between a machine site service and the CSR operator, for example. The telephone switch receives the touch-tone DTMF signal and the modem goes on-line reestablishing a carrier signal.

Product Inventory and Retrieval

Figure 6:
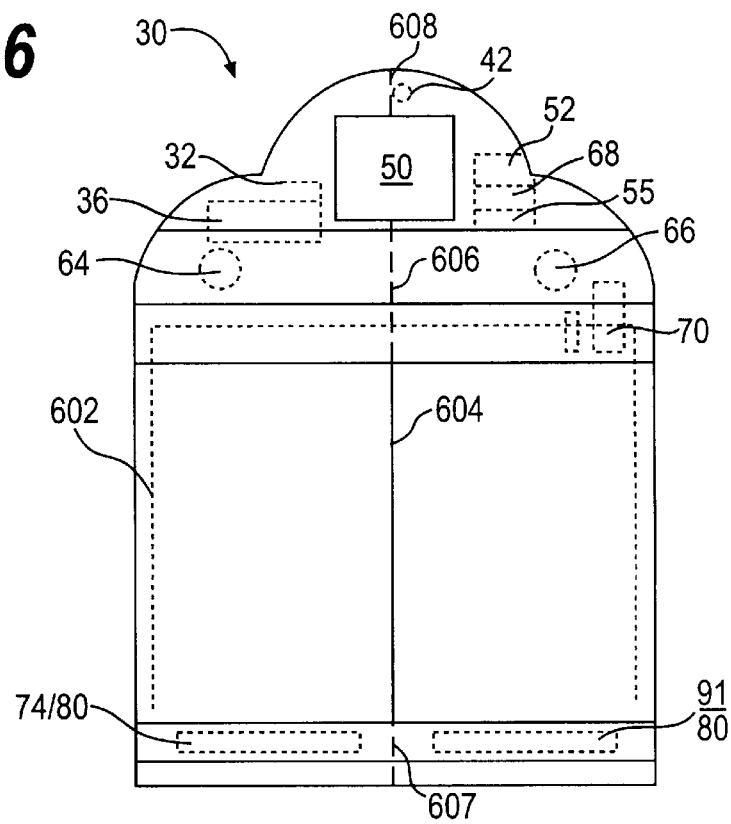
FIG. 6 is a frontal view of the machine 30 shown in FIG. 1.

FIG. 6 is an overall frontal view of music vending machine 30 according to a preferred embodiment of this invention. Elements located internally to the machine are shown by dotted lines. The internal elements include teleswitch 32, video computer 36, interface computer 74, a first part of power supply 80, a stepper motor interface 91 and a second part of power supply 80. Additionally, the bill acceptor 70, the audio/video player/recorder 55, the audio source switch 68, the credit card reader 52, the external speaker microphones 64, 66 and the video camera 42 are illustrated. The construction of the outer cabinet includes a front door 604 designed to substantially cover the x,y,z stepper motor retrieval mechanism 602. However, the doors can be extended along dotted lines 606, 607 and 608, so as to open the entire front of the cabinet from top-to-bottom. The output monitor 50 is located centrally between the two doors at the upper end of the cabinet to provide easy viewing of music videos.

Figure 7B:
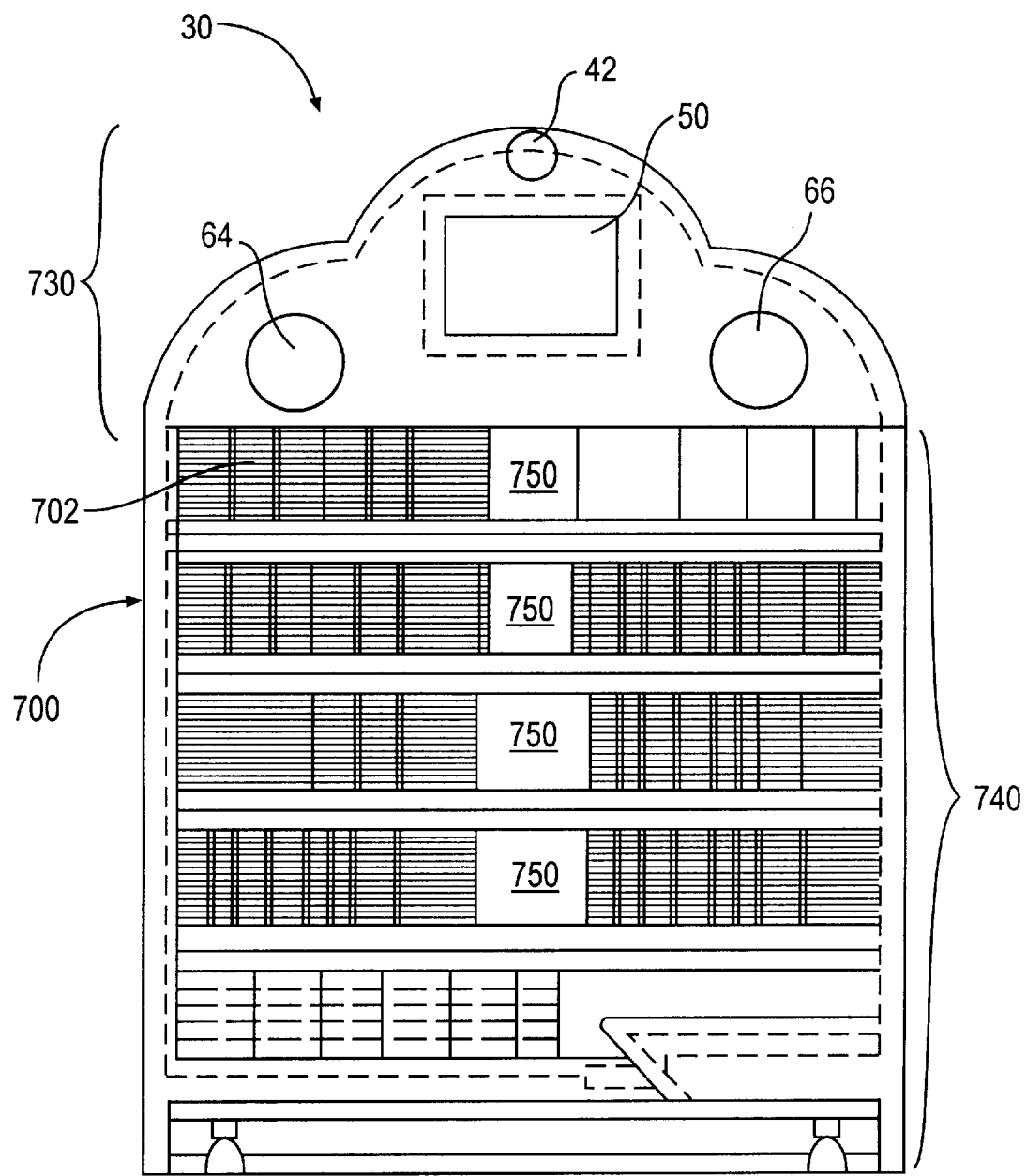

FIGS. 7A–7C illustrate front and side cut-away views of a first embodiment of the vending machine rack design, platen-product server, and shelf configurations. In particular, FIG. 7A is a right side view. FIG. 7B is a frontal view of the machine, and FIG. 7C is a left side view of the vending machine 30. As shown, the vending machine 30 consist of two sections: the first section 730 contains the communications hardware such as the monitor 50, speakers 64 and 66, and camera 42. The second section 740 contains the product storage area 700 and delivery system. The storage system 700 consists of racks of shelves 702 which are arranged in tiers. Each shelf contains an array of bins 710, 712 and 714, as shown in FIG. 7C. Each bin, in turn, contains a stack of the products to be dispensed. Each row, in the illustrated embodiment, is three bins deep and six bins wide, although any number of bins can be employed. Moreover, in the depth direction, each bin is designed to be a different height going from the front 716 to the back 718 of the vending machine 30. The front bin 714 is short in height, the second bin 712 is of an intermediate height, and the third bin 710 is the tallest. As a consequence, the bins going from front to back are staggered in height in order to enable a delivery platen (not shown) to remove product from the back-most bin 710 without being obstructed by bins 712, 714. By staggering the bin heights, the platen movement paths movement are simplified.

Each rack of shelves 702 is mounted on roller bearing tracks (not shown). This design allows the entire shelf rack 702 to be easily pulled out and pushed back into the vending machine 30. Thus, during servicing or supplying, a service person can readily restock the machine 30 by opening the front doors 604 (FIG. 6), and then rolling out an entire rack 702 comprising multiple rows of bins 710, 712 and 714. He may then remove either the entire rack 702, a row of bins 710–714 or individual bins.

For example, if the bins are individually mounted on the rack for easy removal, then each bin full of products can be placed in the position of a removed empty bin. The same scenario can be applied to the row of bins, or an entire rack. Mounting arrangements for the bins, rows and racks are described in more detail below.

The product delivery system shown in FIGS. 7A–7C comprises a separate conveyor 720 arranged below each rack 702 so that products can be drawn from each bin (by virtue of an appropriate movable base assembly, not shown), onto the underlying conveyor, whereupon the product is transported to a delivery door 750 at the same level.

Figure 8A:
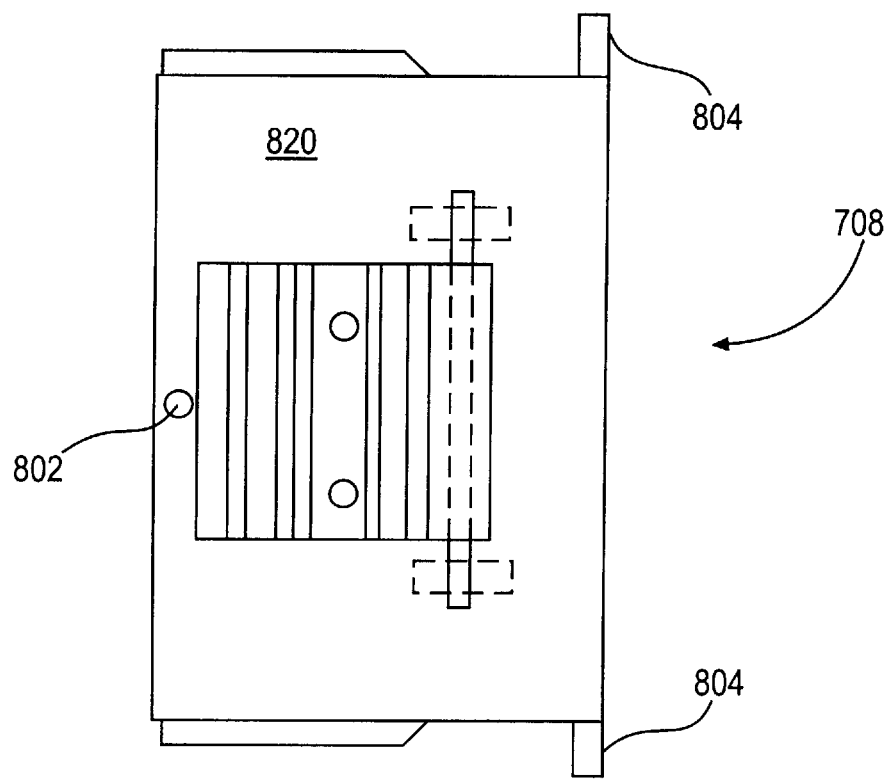
FIGS. 8A and 8B are plan and side views of a product conveying the platen.
Figure 8B:
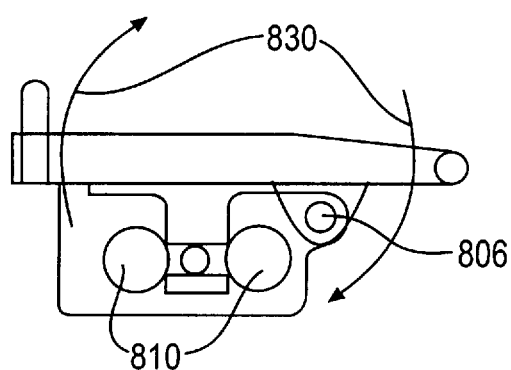

Referring now to FIGS. 8A and 8B, a second embodiment delivery means, consisting of platen 708, is shown. In particular, FIG. 8A is a top view of the platen 708. The platen 708 consists of a flat delivery surface 820. At one end of the platen 708 is pin 802 which is used for removing products from bins 710–714. The pin 802 extends substantially vertically above the plane of delivery surface 820 so that, when the platen 708 is aligned below a bin, pin 802 is positioned to engage an edge of the product. Thus, upon forward movement of the platen relative to the bin in a horizontal (Z axis) direction, the product is slide out from the bottom of the bin onto the platen surface 820.

At an opposite side of the platen 708 from pin 802 are a pair of pins 804, which extend perpendicularly to respective sides of platen 708. These pins are respectively located adjacent a pivot axis 806 (FIG. 8B) and are designed to engage a delivery chute (not shown). The delivery chute has a pair of notches designed to cooperate with each of the pins separately, such that, upon vertical movement of the platen (along the Y axis) the platen pivots, as indicated by arrows 830, the product slides off of the platen surface into a delivery chute.

The platen 708 is mounted by a carrier that slides on rods 810 along the X axis. Movement along the x,y,z axes will be described in further detail below with reference to FIG. 12. Movement is controlled by X axis stepper motor 92 (FIG. 1A) motor which, through an appropriate cable arrangement, propels the platen bidirectionally along the x axis.

Figure 9A:
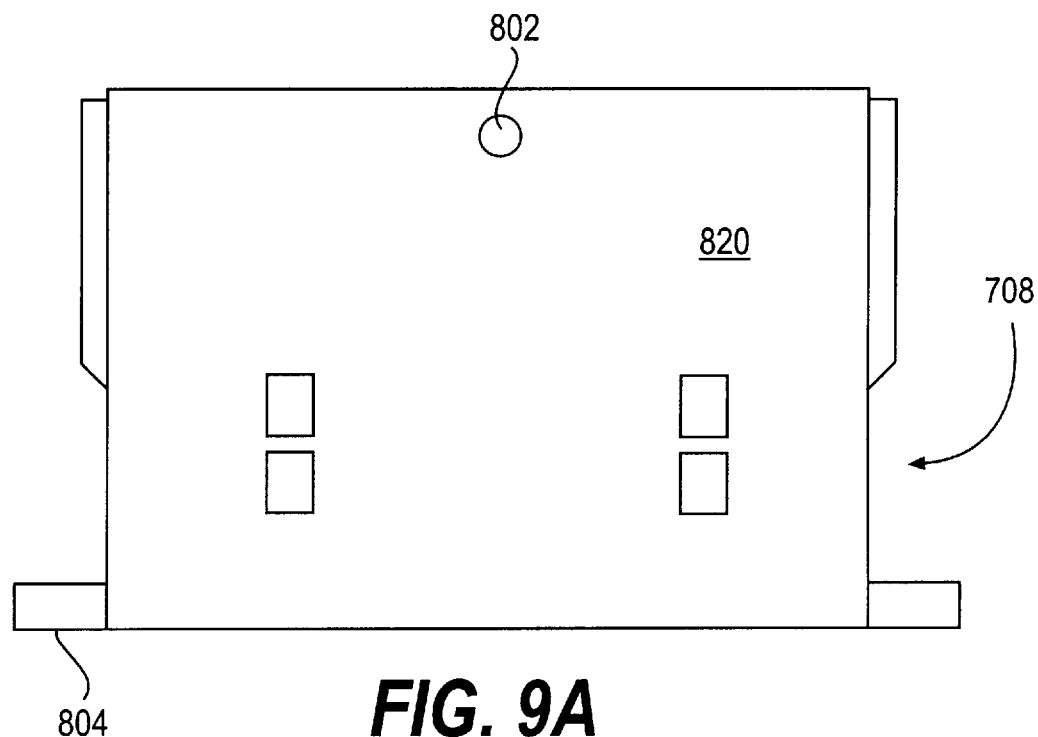
FIGS. 9A–9B illustrate further views of the platen 708 seen in FIGS. 8A–8B.
Figure 9B:
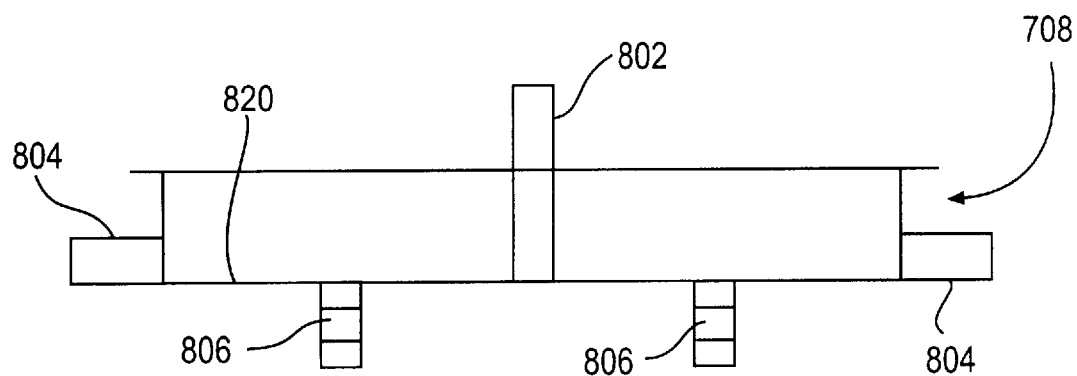

FIGS. 9A and 9B show a front view (9A) and a top view (9B) of the platen 708. No additional description of the platen is needed.

Figure 10A:
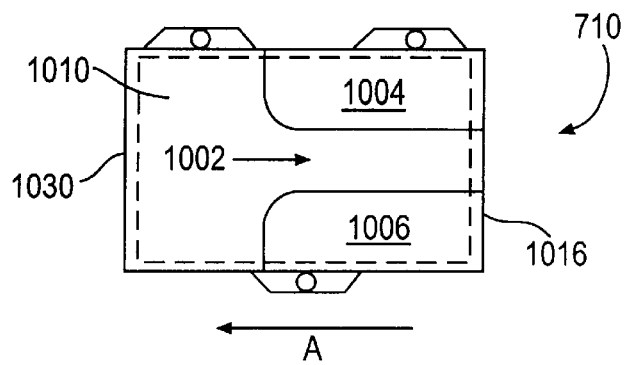
FIGS. 10A–10C are various views of one product storage bin 710 seen in FIGS. 7A–7C.
Figure 10B:
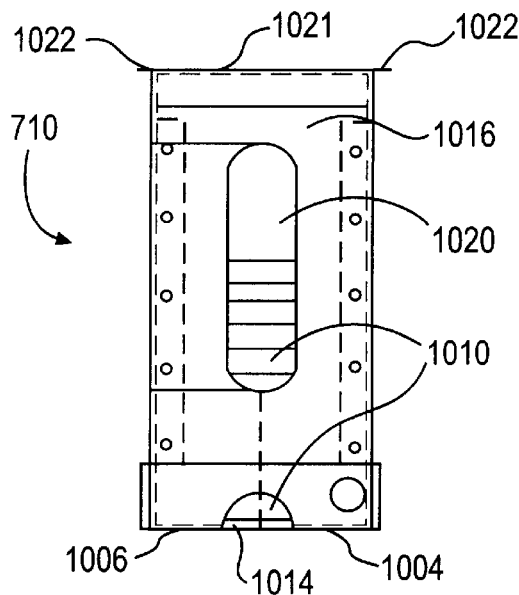
Figure 10C:
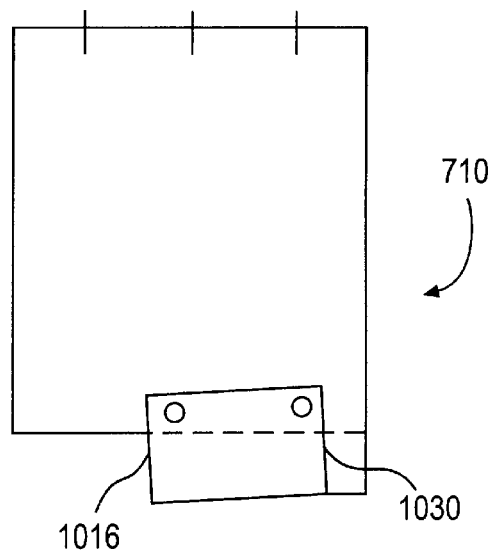

FIGS. 10A–10C respectively illustrate bottom, back and side views of bins 710–714. In FIG. 10A, the bottom of the bin 710 includes two retainer shelves 1004 and 1006. Each shelf is designed to hold a portion of product 1010 which is stacked above the shelves 1004, 1006. A channel 1002 is defined between the shelves 1004 and 1006 so that a bottom portion of the product 1010 is exposed. In addition, a notch 1014, shown in FIG. 10B, is located along a back side 1016 of the bin 710. The arrangement of the channel 1002 and notch 1014 thus provides sufficient clearance in order for the platen pin 802 to extend upward through the notch 1014, engage an edge of the bottom product 1010 in the stack, and slide the product in the direction indicated by arrow A (FIG. 10A) out of the bin 710. The back 1016 of bin 710 also includes finger hole 1020. This hole 1020 enables a service person to view the product supply, realign the products 1010 and easily view the number of products stacked in that bin. The top 1021 of the bin 710 also includes a pair of tabs 1022 which are adapted to engage a top surface of rack 702 (not shown) so that the bin is held in place on the rack, but may also be easily removed by lifting the bin 710 substantially along its vertical axis. FIG. 10C is a side view of bin 710 which illustrates that the bin may be mounted at an angle. In other words, the front of bin 1030 is raised at an angle above the back of the bin 1016. As a consequence, the probability that more than one product 1010 will accidently slide off the bin 710 is reduced due to the inclination of bottom split shelves 1004, 1006.

FIGS. 11A–11C illustrate an x,y,z frame 1100 according to an alternative arrangement for retrieving products 1010. The Y axis comprises a pair of vertically mounted frames, each having a Y axis stepper motor 1130, 1132 (corresponding to motor 93 in FIG. 1A), as well as drive screw mechanism (not shown). The Z axis arrangement 1106 is shown in FIG. 11B. The z axis also includes a pair of screw feed elements 1134 on each side of machine 30 to enable stable movement of the platen 708 mounted thereon. The Z axis assembly includes a drive motor 1140 (corresponding to motor 94 in FIG. 1A) drivingly connected to move platen 708. Finally, the x axis drive arrangement is best seen in FIGS. 11B and 11C, which show platen 708 mounted on a pair of bars 1150 and 1152. The bars 1150, 1152 are mounted to engage platen 708 through slides 810 as previously described. The Z axis 1106 screw feeds 1134 are adapted to engage bars 1150, 1152 through an appropriate mounting in order to move the bars 1150, 1152 along the Z axis. Additionally, the mounting 1102 engages bars 1150, 1152 to produce movement along the Y axis as well.

FIGS. 12A–12C respectively show the platen 708 positions vis-a-vis the delivery chute 1210 (FIGS. 12A and 12B) and a front view (FIG. C) of the delivery chute 1210.

While the invention has been particularly shown and described with reference to the preferred embodiments thereof, it will be understood by those skilled in the art that various changes in forms, details and applications can be made without departing from the spirit and scope of the invention.

What is claimed is:

1. A vending system, comprising:
   a service center including a first computer and a first video monitor; and
   a plurality of vending machines, each including:
      a storage section containing a product inventory,
      a retrieval mechanism operating in the storage section to retrieve selected products from the inventory and deliver the selected products to a vending port accessible to customers,
      a second video monitor,
      a speaker,
      means for driving the second video monitor and the speaker to provide audio/video programming to customers,
      a video camera for generating scene images of a vending machine site including customers,
      input means for accepting product selections and product payments made by customers, and
      a second computer connectable to the first computer by a telephone line and operating to control the retrieval mechanism, the driving means, the video camera, and the input means.

2. The vending system defined in claim 1, wherein the second computer includes means for transmitting the scene images generated by the video camera to the service center for display on the first video monitor.

3. The vending system defined in claim 1, wherein said second computer of each vending machine includes means for compiling and transmitting activity reports to said first computer over the phone line.

4. The vending system defined in claim 2, wherein the service center further includes means providing a first phone set, and each vending machine further includes a microphone, the speaker and the microphone operable as a second phone set connectable to the first phone set via the telephone line to accommodate voice communications between customers and a service center operator.

5. The vending system defined in claim 1, wherein the driving means includes a video computer for generating with the speaker the audio/video programming displayed by the second video monitor and reproduced by the speaker, and the video computer includes means for generating a menu of the products in the inventory for selection by the customer, the menu being scrolled across a first screen portion of the second video monitor while the audio/video programming is displayed on a second screen portion of the second video monitor.

6. The vending system defined in claim 2, wherein each vending machine includes means causing the second computer to notify the first computer of an abnormal condition, the first computer, in response, activating the scene image transmitting means.

7. The vending system defined in claim 6, wherein each vending system includes recording means for producing an audio/video recording of machine-site activities incident with the abnormal condition.

8. The vending system defined in claim 1, wherein the storage section includes:
   a plurality of vertically spaced shelves of bins containing products in stacked relation, each shelf includes a matrix array of the bins arranged in first rows extending in a front-to-back direction of the storage section and intersecting second rows extending in a side-to-side direction of the storage section, the bins in the first rows having bottom product openings disposed at staggered elevations,
   the retrieval mechanism including a platen mounted for retrieval movements in the side-to-side direction to a selected one of the first rows of bins and in the front-to-back direction to a selected one of the second rows of bins and extracting movements to extract a product onto the platen from the bin at the intersection of the selected first and second rows through the bottom opening thereof for delivery to the vending port, and
   means controlled by the second computer to power the movements of the platen according to a customer product selection accepted by the input means.

9. A vending system including a central station connectable to any one of a plurality of vending machines by phone lines, each vending machine comprising:
   computer means;

means for storing an inventory of different types of products available for purchase by customers;

means for retrieving from the inventory and dispensing customer-selected products under control of the computer means;

audio/video production means;

means for storing audio/video data for retrieval and playback by said production means under control of said computer means as a series of audio/video presentations to a customer, the computer means changing a playback order of the audio/video presentations in response to customer selection of a particular audio/video presentation for playback;

means including the computer means for accumulating a record of vending machine activities including customer selections; and means including the computer means for transmitting the activity record to the central station.

10. The vending system of claim 9, wherein the plurality of vending machines are divided into a plurality of groups of vending machines, one vending machine in each vending machine group being equipped to function as a master vending machine for receiving phone line transmissions of activity reports from remaining vending machines of the group and compiling a group activity report for phone line transmission to the central station.

11. The vending system defined in claim 9, wherein at least one of the plurality of vending machines further includes:

a database containing video images of views from a plurality of representative seat locations at various entertainment facilities;

means including the computer means for retrieving from the database and displaying on the production means a video image representative of the view from a seat selected by customer input; and a printer, controlled by the computer means for printing a ticket/receipt for the customer-selected seat.

12. The vending system defined in claim 9, wherein at least one of the vending machines further includes:

a key pad connected to the computer means and usable by on-site customers to select audio/video presentations for playback by the production means;

means for connecting the computer means to off-site TV receivers; and means including the computer means for accepting remote customer selections of audio/video presentation playbacks on the off-site TV receivers.

13. The vending system of claim 9, wherein at least one of the plurality of vending machines further includes:

a keypad;

payment means;

debit card means; and means including the computing means responsive to a customer input via the keypad and customer payment acceptance by the payment means for controlling the debit card means to dispense to the customer a debit card containing a stored money amount corresponding to the customer payment accepted by the payment means.

14. The vending system of claim 9, wherein each of said vending machines includes audio/video out terminals connectable to one or more external TV receivers for production of the audio/video presentations.

15. The vending system of claim 9, wherein each vending machine includes a printer for printing, under control of the computer means, one or more types of documents dispensed to customers, including receipts, credit/refund slips, tickets, and facsimile documents.

16. A method of vending tickets to events, comprising the steps of:

maintaining a first database containing video data representative of views from a plurality of seats distributed throughout each of a plurality of facilities where the events are to be held;

maintaining a second database containing an inventory of available tickets for seats at each of the facilities;

accepting an inquiry from a customer as to ticket availability for a selected event;

retrieving from the second database a menu of the available tickets for the selected event;

communicating the menu to a video monitor for display to the customer;

accepting a ticket selection from the customer;

retrieving from the first database the video data representing the view from the seat assigned to the selected ticket; and communicating the retrieved video data to the video monitor for display to the customer.

17. The method of claim 16, further comprising the step of communicating instructions to a printer at the customer site to print the selected ticket.

18. A system for vending tickets to events, comprising:

a first memory for storing a first database containing video data representative of views from a plurality of seats distributed throughout each of a plurality of facilities where the events are to be held;

a second memory for storing a second database containing an inventory of available tickets at each of the facilities;

means for retrieving from the first database the video data of seat views for a selected facility;

means for communicating the retrieved video data to a video monitor at a customer site for display to a customer of the seat views selected by the customer; and means for retrieving from the second database a menu of available tickets assigned to seats for which the selected seat views are representative; and means for communicating the retrieved ticket menu to the video monitor for display to the customer.

19. The system of claim 18, further comprising means for communicating instructions to a printer at the customer site to print a ticket selected by the customer from the ticket menu.

* * * * *